US012667812B1

(12) United States Patent
Baroud et al.

(10) Patent No.: US 12,667,812 B1
(45) Date of Patent: Jun. 30, 2026

(54) METHOD OF CREATING GREATER ADHESION BETWEEN ASYMMETRIC PVDF ACTIVE LAYER AND PEI FIBER SUPPORT TO OBTAIN MULTILAYER JANUS MEMBRANE

(71) Applicant: King Fahd University of Petroleum and Minerals, Dhahran (SA)

(72) Inventors: Turki Nabieh Baroud, Dhahran (SA); Mohammed Abdul Azeem, Dhahran (SA); Aminu Doguwa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/356,933

(22) Filed: Oct. 13, 2025

(51) Int. Cl.
| | |
|---|---|
| *B01D 69/12* | (2006.01) |
| *B01D 67/00* | (2006.01) |
| *B01D 71/02* | (2006.01) |
| *B01D 71/34* | (2006.01) |
| *B01D 71/42* | (2006.01) |
| *B01D 71/64* | (2006.01) |

(52) U.S. Cl.
CPC ....... *B01D 69/1216* (2022.08); *B01D 67/002* (2013.01); *B01D 71/022* (2013.01); *B01D 71/34* (2013.01); *B01D 71/421* (2022.08); *B01D 71/643* (2022.08); *B01D 2325/02834* (2022.08); *B01D 2325/06* (2013.01); *B01D 2325/36* (2013.01); *B01D 2325/38* (2013.01); *B01D 2325/40* (2013.01)

(58) Field of Classification Search
CPC .............. B01D 69/1216; B01D 67/002; B01D 71/022; B01D 71/34; B01D 71/421; B01D 71/643; B01D 2325/02834; B01D 2325/06; B01D 2325/36; B01D 2325/38; B01D 2325/40
See application file for complete search history.

(56) References Cited

U.S. PATENT DOCUMENTS

| | | | |
|---|---|---|---|
| 2015/0218018 A1 | 8/2015 | Lee et al. | |
| 2015/0360184 A1 | 12/2015 | Qtaishat et al. | |
| 2019/0207190 A1 | 7/2019 | Hu et al. | |

FOREIGN PATENT DOCUMENTS

| | | |
|---|---|---|
| CN | 115069095 A | 9/2022 |

OTHER PUBLICATIONS

Zuo, Hydrophobic/hydrophilic PVDF/Ultem® dual-layer hollow fiber membranes with enhanced mechanical properties for vacuum membrane distillation, 2017 (Year: 2017).*

Liu, Efficient Oil/Water Separation Membrane Derived from Super-Flexible and Superhydrophilic Core-Shell Organic/Inorganic Nanofibrous Architectures, 2019 (Year: 2019).*

(Continued)

*Primary Examiner* — Waqaas Ali

(74) *Attorney, Agent, or Firm* — Oblon, McClelland, Maier & Neustadt, L.L.P.

(57) ABSTRACT

A multilayer Janus membrane with directional wettability includes a polyvinylidene fluoride (PVDF) layer, a polyetherimide (PEI) layer and an intermediate layer of copper oxide nanoparticles and vinylidene fluoride and hexafluoropropylene copolymer (PVDF-HFP) or polyacrylonitrile (PAN). The intermediate layer is in contact between the PVDF layer and the PEI layer, and the PEI fibers interlock between the granular particles of the intermediate layer.

20 Claims, 26 Drawing Sheets

(56) References Cited

OTHER PUBLICATIONS

Aminu Doguwa, et al., "Bio-inspired surface engineered multilayer Janus membrane for efficient desalination of highly saline water in membrane distillation", npj Clean Water, vol. 8, Issue 60, 2025 (17 pages).

Kunpeng Wang, et al., "Development of a composite membrane with underwater-oleophobic fibrous surface for robust anti-Oil-fouling membrane distillation", Journal of Colloid and Interface Science, vol. 537, Mar. 1, 2019, pp. 375-383, Introduction Only (7 pages).

Jian Zuo, et al., "Hydrophobic/hydrophilic PVDF/Ultem® dual-layer hollow fiber membranes with enhanced mechanical properties for vacuum membrane distillation", Journal of Membrane Science, vol. 523, Feb. 1, 2017, pp. 103-110, Excerpts only (8 pages).

* cited by examiner

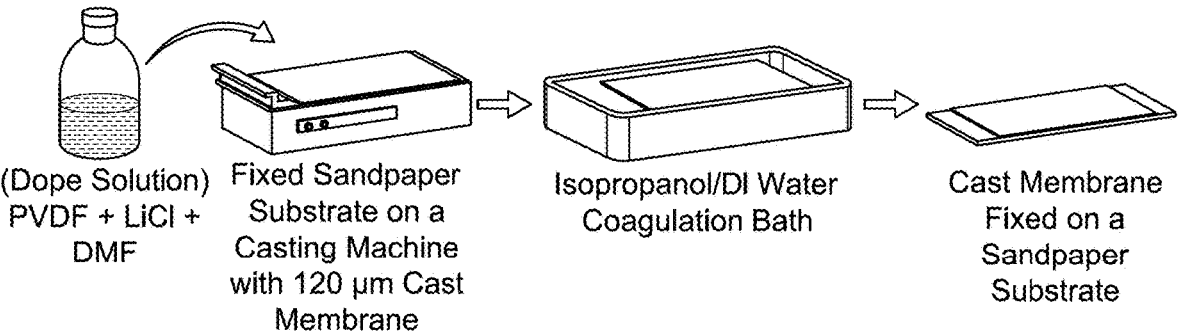

(Dope Solution)       Fixed Sandpaper        Isopropanol/DI Water       Cast Membrane
PVDF + LiCl +         Substrate on a         Coagulation Bath           Fixed on a
DMF                   Casting Machine                                   Sandpaper
                      with 120 µm Cast                                  Substrate
                      Membrane

FIG. 2A

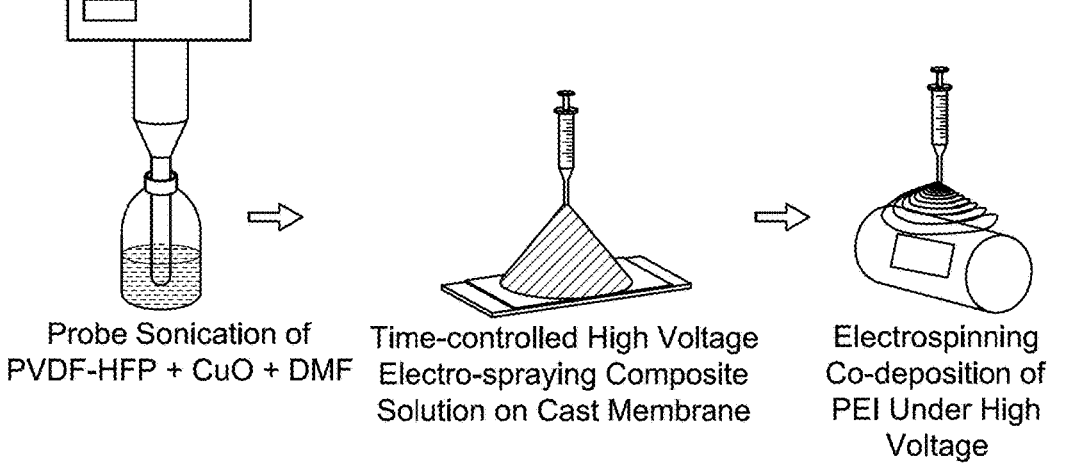

Probe Sonication of      Time-controlled High Voltage      Electrospinning
PVDF-HFP + CuO + DMF     Electro-spraying Composite         Co-deposition of
                         Solution on Cast Membrane          PEI Under High
                                                            Voltage

FIG. 2B

Janus Membrane Cross-section

METHOD OF CREATING GREATER ADHESION BETWEEN ASYMMETRIC PVDF ACTIVE LAYER AND PEI FIBER SUPPORT TO OBTAIN MULTILAYER JANUS MEMBRANE

STATEMENT REGARDING PRIOR DISCLOSURE BY THE INVENTORS

Aspects of the present disclosure are described in Doguwa A. et al., "Bio-inspired surface engineered multilayer Janus membrane for efficient desalination of highly saline water in membrane distillation" published in Issue 8, Article Number 60, npj Clean Water, which is incorporated herein by reference in its entirety.

STATEMENT OF ACKNOWLEDGEMENT

Support provided by the Interdisciplinary Research Center for Membranes and Water Security and King Fahd University of Petroleum and Minerals (KFUPM), Saudi Arabia through the project INMW2107 is gratefully acknowledged.

BACKGROUND

Technical Field

The present disclosure is related to a multilayer Janus membrane. More particularly, the present disclosure is related to a multilayer Janus membrane including a polyvinylidene fluoride (PVDF) layer, a polyetherimide (PEI) layer, and an intermediate layer including copper oxide (CuO) nanoparticles and a polymer of vinylidene fluoride and hexafluoropropylene copolymer (PVDF-HFP) or polyacrylonitrile (PAN),

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Water scarcity has become a global challenge due to rapid industrialization and population growth, necessitating efficient seawater and hypersaline water purification methods. Conventional separation techniques such as reverse osmosis (RO) and thermal distillation suffer from drawbacks like scaling and fouling. Membrane distillation (MD), employing porous hydrophobic membranes, has emerged as a promising alternative because it produces high-purity water under moderate conditions. However, challenges such as low permeate flux and early membrane wetting limit its large-scale use [See: Y.-X. Huang, Z. Wang, D. Hou, and S. Lin, "Coaxially electrospun super-amphiphobic silica-based membrane for anti-surfactant-wetting membrane distillation," J Memb Sci, vol. 531, pp. 122-128, June 2017]. To overcome these issues, recent efforts have focused on surface modifications, nanoparticle incorporation, and advanced membrane designs to enhance hydrophobicity and fouling resistance [See: T. N. Baroud, "Tuning PVDF Membrane Porosity and Wettability Resistance via Varying Substrate Morphology for the Desalination of Highly Saline Water," Membranes (Basel), vol. 13, no. 4, p. 395, March 2023; R. Zheng, Y. Chen, J. Wang, J. Song, X.-M. Li, and T. He, "Preparation of omniphobic PVDF membrane with hierarchical structure for treating saline oily wastewater using direct contact membrane distillation," J Memb Sci, vol. 555, pp. 197-205, June 2018; J. Hu, H. B. Harandi, Y. Chen, L. Zhang, H. Yin, and T. He, "Anisotropic gypsum scaling of corrugated polyvinylidene fluoride hydrophobic membrane in direct contact membrane distillation," Water Res, vol. 244, p. 120513, October 2023; W. Zhang, B. Hu, Z. Wang, and B. Li, "Fabrication of omniphobic PVDF composite membrane with dual-scale hierarchical structure via chemical bonding for robust membrane distillation," J Memb Sci, vol. 622, p. 119038, March 2021].

Janus membranes, consisting of asymmetric hydrophilic and hydrophobic layers, have gained significant attention for addressing mass transfer resistance and improving saline rejection and flux compared to single-layer membranes. These are typically fabricated by depositing a hydrophilic layer onto polymeric hydrophobic substrates such as polyvinylidene fluoride (PVDF), polytetrafluoroethylene (PTFE), polypropylene (PP), or polysulfone (Psf) [See: W. Zhang, S. Yu, P. Li, X. Ji, R. Ning, and P. Li, "Preparation Janus membrane via polytetrafluoroethylene membrane modification for enhanced performance of vacuum membrane distillation desalination," Sep Purif Technol, vol. 313, p. 123465, May 2023; H.-C. Yang, W. Zhong, J. Hou, V. Chen, and Z.-K. Xu, "Janus hollow fiber membrane with a mussel-inspired coating on the lumen surface for direct contact membrane distillation," J Memb Sci, vol. 523, pp. 1-7, February 2017]. Despite their promise, delamination at the interface due to differences in physicochemical properties of the layers remains a challenge. Strategies such as covalent bonding or optimized interfacial interactions can enhance adhesion, though they may introduce thermal and mass transfer limitations.

Accordingly, it is one object of the present disclosure to provide a method of developing an efficient and durable Janus membrane for water filtration applications that may circumvent the above-specified drawbacks and limitations of the membranes and methods known in the art.

SUMMARY

In an exemplary embodiment, a multilayer Janus membrane is described. The multilayer Janus membrane includes a polyvinylidene fluoride (PVDF) layer, a polyetherimide (PEI) layer including a plurality of PEI fibers, and an intermediate layer. The intermediate layer includes copper oxide (CuO) nanoparticles and at least one polymer selected from vinylidene fluoride and hexafluoropropylene copolymer (PVDF-HFP) and polyacrylonitrile (PAN). The intermediate layer also includes a plurality of granular particles and is in contact and between the PVDF layer. and the PEI layer. The PEI fibers interlock between the granular particles of the intermediate layer.

In some embodiments, the multilayer Janus membrane has a directional wettability, where the PVDF layer has a hydrophobic surface, and the PEI layer has a hydrophilic surface.

In some embodiments, the PVDF layer has a water contact angle of 130°-150°.

In some embodiments, the PVDF layer has a textured porous surface including a plurality of PVDF pores with a mean pore size of 0.58 to 0.62 μm, and the PVDF pores are interconnected with each other, forming a plurality of vertically aligned channels.

In some embodiments, the PVDF pores have openings at the surface, and the PVDF layer has an average surface roughness of 140 to 180 nm.

In some embodiments, the PEI layer has a water contact angle of 40° to 50°.

In some embodiments, the intermediate layer includes CuO nanoparticles and PVDF-HFP, where the intermediate layer exhibits a water contact angle of 150° to 160°.

In some embodiments, the granular particles of the intermediate layer are distributed across the PVDF layer and form a plurality of particle clusters having non-uniform sizes.

In some embodiments, the intermediate layer has an average surface roughness of 650 to 700 nm and a mean pore size of 0.55 to 0.60 μm.

In some embodiments, the intermediate layer includes CuO nanoparticles and PAN, where the intermediate layer exhibits a water contact angle of 20° to 40° and has a mean pore size of 0.50 to 0.55 μm.

In some embodiments, the granular particles of the intermediate layer are interconnected with a plurality of PAN fibers.

In some embodiments, the PEI fibers intermingle in between the granular particles of the intermediate layer and anchors on the surface of the intermediate layer.

In some embodiments, the PEI layer have a mean pore size of 0.45 to 0.50 μm.

In another exemplary embodiment, a method of fabricating the multilayer Janus membrane having the PVDF layer, the intermediate layer and the PEI layer is described. The method includes forming a PVDF solution including PVDF in the form of powder, lithium chloride and dimethylformamide (DMF) and casting the PVDF solution on a sandpaper substrate to form a PVDF coated sandpaper. The method further includes immersing the PVDF coated sandpaper in a mixture of water and isopropanol to form a PVDF membrane coated sandpaper. where a PVDF layer with a non-textured surface is on the top and a textured surface is in contact with the sandpaper substrate. Further, the method includes electrospraying an intermediate solution including DMF, CuO nanoparticles and at least one polymer selected from PVDF-HFP and PAN onto the non-textured surface of the PVDF membrane, followed by isolating a two-layer membrane from the sandpaper substrate and mounting the two-layer membrane coated sandpaper onto a rotating drum having an aluminum foil substrate, where the textured surface of the PVDF is in contact with the aluminum foil substrate. The method further includes electrospinning a plurality of PEI fibers from a PEI solution onto the two-layer membrane to form a three-layer membrane, where the PEI solution includes PEI and N-methyl-pyrrolidone. Finally, the method includes drying the three-layer membrane to form the multilayer Janus membrane.

In some embodiments, the intermediate layer includes a plurality of granular particles, which are in contact and between the PVDF layer and the PEI layer, and the PEI fibers interlock between the granular particles of the intermediate layer.

In yet another exemplary embodiment, a method of water membrane distillation using the multilayer Janus membrane is described. The method includes flowing a saline solution through the multilayer Janus membrane where the saline solution includes saline at a concentration of 1 to 70,000 ppm. Further, the method includes absorbing the saline on the multilayer Janus membrane to form a filtered water. The multilayer Janus membrane includes a PVDF layer, a PEI layer, and an intermediate layer including copper oxide nanoparticles and at least one polymer selected from PVDF-HFP and PAN.

In some embodiments, the intermediate layer includes a plurality of granular particles, and are in contact with and between the PVDF layer and the PEI layer. The PEI fibers interlock between the granular particles of the intermediate layer.

In some embodiments, the method of water membrane distillation has a flux of 30 to 40 $kg \cdot m^{-2} \cdot h^{-1}$, where the flowing has a duration of 1 to 60 hours.

In some embodiments, the method of water membrane distillation has a saline rejection rate of at least 99%, where the absorption has a duration of 1 to 60 hours.

In some embodiments, the method of water membrane distillation has a constant saline rejection rate with no decline, where the absorption has a duration of 1 to 60 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2A is a schematic illustration showing the preparation of a polyvinylidene fluoride (PVDF) membrane coated sandpaper having a PVDF layer with a non-textured surface on the top and a textured surface in contact with the sandpaper substrate, according to certain embodiments.

FIG. 2B is a schematic illustration showing the preparation of the multilayer Janus membrane, where an intermediate solution comprising dimethylformamide, copper oxide nanoparticles and at least one polymer selected from vinylidene fluoride and hexafluoropropylene copolymer (PVDF-HFP) and polyacrylonitrile (PAN) is electrospun onto the non-textured surface of the PVDF membrane, according to certain embodiments.

DETAILED DESCRIPTION

Figure 1:
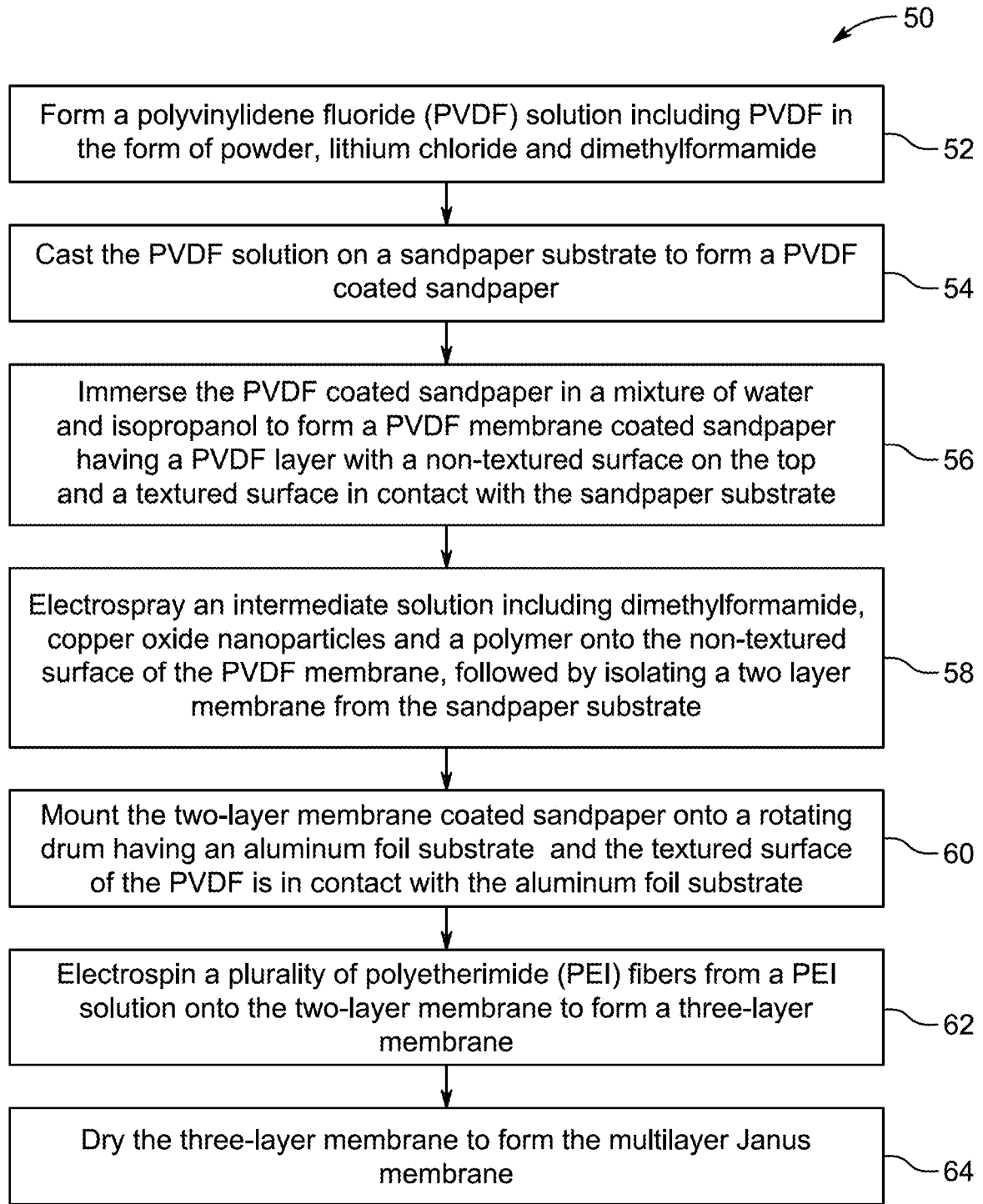
FIG. 1 is an exemplary flowchart illustrating the synthesis of a multilayer Janus membrane, according to certain embodiments.

Embodiments of the present invention may now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words "a", "an", and the like generally carry a meaning of "one or more", unless stated otherwise.

Furthermore, the terms "approximately," "approximate", "about," and similar terms generally refer to ranges that include the identified value within a margin of 20%, 10%, or preferably 5%, and any values therebetween.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

As used herein, the term "room temperature" refers to a temperature range of '25 degrees Celsius (° C.)±3° C.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

A wt. % of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopes of hydrogen include $^{1}H$, $^{2}H$, and $^{3}H$. Isotopes of copper include $^{63}Cu$, and $^{65}Cu$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term "nanoparticles" refers to small particles with sizes typically ranging from 1 to 100 nanometers, 1 to 1000 nanometers, or 1 to 9000 nanometers.

As used herein, the term "multilayer" refers to a structure, system, or composition comprising two or more distinct layers that are physically or functionally stacked, bonded, or integrated together. Each layer may serve a unique purpose, possess different material properties, or perform specific functions within the overall system. The layers may be arranged in a sequential or non-sequential manner and may include, but are not limited to, structural layers, functional layers, protective coatings, conductive layers, insulating layers, or any combination thereof.

As used herein, the term "electrospinning" refers to a technique for producing very fine fibers from a polymer solution or melt using a high-voltage electric field.

As used herein, the term "mounting" refers to the process of fixing, attaching, or positioning a material or component onto a support or surface for further use or analysis.

As used herein, the term "pore size of a membrane" refers to the average diameter of the openings within the membrane structure that permit the passage of fluids, gases, or solutes. It is a key parameter influencing filtration efficiency, selectivity, and permeability, and is typically measured in micrometers or nanometers using techniques such as porometry, SEM, or bubble point testing. Membranes may be classified based on pore size into microfiltration, ultrafiltration, nanofiltration, or reverse osmosis categories, with each suited to specific separation applications.

As used herein, the term "surface roughness" refers to the measure of the texture or irregularities present on a surface, typically quantified by the deviations in the surface profile from an ideal smooth plane. Surface roughness influences various surface properties, including wettability, adhesion, friction, and optical characteristics. Surface roughness is commonly expressed using parameters such as $R_a$ (arithmetical mean roughness), or Rz (average maximum height). The controlled roughness can enhance or reduce interactions with liquids, particles, or biological entities.

As used herein, the term "wettability of a membrane" refers to the ability of a liquid, typically water, to maintain contact with the surface of the membrane. Wettability is a critical parameter that influences fluid transport, separation efficiency, and surface interactions in membrane-based systems. It is commonly evaluated by measuring the water contact angle on the membrane surface.

As used herein, the term "water contact angle" refers to the angle formed at the interface between a water droplet and a solid surface, measured through the liquid at the point where the liquid, solid, and vapor phases meet. It is an indicator of the wettability of the surface: a low contact angle (typically <90°) signifies high wettability or hydrophilicity, whereas a high contact angle (typically >90°) indicates low wettability or hydrophobicity. Surfaces exhibiting contact angles greater than 150° are generally referred to as superhydrophobic.

As used herein, the term "hydrophobic" or "hydrophobicity" refers to the property of a material or surface that exhibits a low affinity for water, thereby resisting wetting.

As used herein, the term "hydrophilic" or "hydrophilicity" refers to the property of a material or surface that exhibits a strong affinity for water, thereby promoting wetting.

Aspects of this disclosure are directed to a multilayer Janus membrane and a method of making such multilayer Janus membrane through a nature-inspired gecko-adhesion mechanism. The membrane is fabricated by a layer-by-layer co-deposition process that integrates a surface roughened polyvinylidene fluoride (PVDF) flat-sheet membrane prepared via phase inversion, an electrosprayed hydrophobic vinylidene fluoride and hexafluoropropylene copolymer (PVDF-HFP) or polyacrylonitrile (PAN) interfacial layer modified with copper oxide (CuO) nanoparticles, and an electrospun hydrophilic polyetherimide (PEI) fiber bottom layer. This configuration enables the formation of a robust and functional Janus membrane structure suitable for advanced separation applications.

According to a first aspect of the present disclosure, a multilayer Janus membrane is described. The multilayer Janus membrane includes a PVDF layer, a PEI and an intermediate layer. The PVDF layer has a hydrophobic surface, the PEI layer has a hydrophilic surface, and the intermediate layer contains CuO nanoparticles and at least one polymer selected from PVDF-HFP and PAN. Due to the hydrophobic and hydrophilic nature of the layers in the Janus membrane, it shows directional wettability, enabling efficient liquid separation and advanced water treatment applications.

In some embodiments, the PVDF layer of the multilayer Janus membrane has a textured porous surface including a plurality of PVDF pores with a mean pore size of 0.58 to 0.62 μm, and preferably 0.59 to 0.61 μm. In a preferred embodiment, the PVDF pores have a mean pore size of 0.581±0.15 μm. The PVDF pores have openings at the surface and are interconnected with each other, forming a plurality of vertically aligned channels. In other embodiments, the pores may be either interconnected or isolated and can form various aligned channels.

In some embodiments, the PVDF layer of the multilayer Janus membrane has an average surface roughness of 140 to 180 nm, preferably 142 to 178 nm, preferably 144 to 176 nm, and preferably 148 to 174 nm. In a preferred embodiment, the PVDF layer has an average surface roughness of 148 nm.

In some embodiments, the PVDF layer of the multilayer Janus membrane has a water contact angle of 120° to 160°, preferably 122° to 158°, preferably 124° to 156°, preferably 126° to 154°, preferably 128° to 152°, preferably 130° to 150° and preferably 131° to 140°. In a preferred embodiment, the PVDF layer has a water contact angle of 131.5°.

The PEI layer of the multilayer Janus membrane includes a plurality of PEI fibers, where the PEI fibers intermingle between the granular particles of the intermediate layer and anchor on the surface of the intermediate layer. In some embodiments, the PEI layer has a mean pore size of 0.45 to 0.50 μm, preferably 0.46 to 0.49 μm, and preferably 0.47 to 0.48 μm. In a preferred embodiment, the mean pore size of the PEI layer has a mean pore size of 0.498±0.12 μm. In some embodiments, the PEI layer has a water contact angle of 40° to 50°, preferably 40.5° to 49.5° and 41° to 49°. In a preferred embodiment, the PEI layer has a water contact angle of 41.4°.

In some embodiments, the multilayer Janus membrane has a directional wettability, where the PVDF layer has a hydrophobic surface, and the PEI layer has a hydrophilic surface.

In some embodiments, the intermediate layer of the multilayer Janus membrane includes CuO nanoparticles and at least one polymer selected from PVDF-HFP and PAN. The intermediate layer includes a plurality of granular particles and is in contact and between the PVDF layer and the PEI layer. The PEI fibers interlock between the granular particles of the intermediate layer.

In some embodiments, the intermediate layer includes CuO nanoparticles and PVDF-HFP. The granular particles of the intermediate layer form a plurality of particle clusters having non-uniform sizes distributed across the PVDF layer. In some embodiments, the intermediate layer has an average surface roughness of 650 to 700 nm, preferably 660 to 690 nm, preferably 670 to 680 nm, preferably 672 to 678 nm, preferably 674 to 676 nm. In a preferred embodiment, the intermediate layer has an average surface roughness of 665 nm. In some embodiments, the intermediate layer has a mean pore size of 0.55 to 0.60 μm, preferably 0.56 to 0.59 μm and preferably 0.57 to 0.58 μm. In a preferred embodiment, the mean pore size of the intermediate layer including CuO nanoparticles and PVDF-HFP is 0.551±0.20 μm.

In some embodiments, the intermediate layer of the multilayer Janus membrane including CuO nanoparticles and PVDF-HFP exhibits a water contact angle of 150° to 160°, preferably 150.5° to 159° and preferably 151° to 155°. In a preferred embodiment, the intermediate layer of the multilayer Janus membrane including CuO nanoparticles and PVDF-HFP has a water contact angle of 151.8°.

In some embodiments, the intermediate layer of the multilayer Janus membrane includes CuO nanoparticles and PAN. The granular particles of the intermediate layer are interconnected with a plurality of PAN fibers. In some embodiments, the intermediate layer of the multilayer Janus membrane has a mean pore size of 0.50 to 0.55 μm, preferably 0.51 to 0.54 μm and preferably 0.52 to 0.53 μm. In a preferred embodiment, the intermediate layer has a mean pore size of 0.530±0.33 μm. In some embodiments, the intermediate layer exhibits a water contact angle of 20° to 40°, preferably 20.5° to 39.5°, preferably 21° to 38°, preferably 22° to 36°, preferably 23° to 35°, preferably 24° to 30°, preferably 25° to 29° and preferably 26° to 28°. In a preferred embodiment, the intermediate layer has a water contact angle of 27.2°.

Referring to FIG. 1, a method 50 of fabricating the multilayer Janus membrane having a PVDF layer, an intermediate layer and a PEI layer is described. The intermediate layer includes a plurality of granular particles and is in contact and between the PVDF layer and the PEI layer, where the PEI fibers interlock between the granular particles of the intermediate layer. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming a PVDF solution including PVDF in the form of powder, lithium chloride and dimethylformamide.

In some embodiments, the PVDF powder used is preheated at 50-70° C., preferably 51-69° C., preferably 51.5-68.5° C., preferably 52-68° C., preferably 52.5-67.5° C., preferably 53-67° C., preferably 53.5-66° C., preferably 54-65° C., preferably 55-64° C., preferably 56-63° C., preferably 57-62° C., and preferably 58-61° C., for 0.5-2 h, preferably 0.60-1.90 h, preferably 0.70-1.80 h, preferably 0.80-1.50 h and preferably 0.90-1.25 h. In a preferred embodiment, the PVDF powder is heated in an oven at 60° C. for 1 h to eliminate residual moisture. Other methods to eliminate moisture from the PVDF powder include vacuum drying at moderate temperature, freeze-drying to sublimate water under low pressure, microwave-assisted drying for rapid moisture removal, and infrared drying to achieve efficient surface and bulk dehydration.

In some embodiments, other lithium salt may be used, including lithium perchlorate (LiClO4), lithium bis(trifluoromethanesulfonyl)imide (LiTFSI), lithium hexafluorophosphate (LiPF$_6$), lithium tetrafluoroborate (LiBF$_4$), and lithium trifluoromethanesulfonate (LiCF$_3$SO$_3$). Other suitable examples are lithium nitrate (LiNO$_3$), lithium sulfate (Li$_2$SO$_4$), lithium acetate (CH$_3$COOLi), lithium hydroxide (LiOH), lithium bromide (LiBr), lithium iodide (LiI), and lithium carbonate (Li$_2$CO$_3$). In a preferred embodiment, lithium chloride is used as the lithium salt.

In some embodiments, other organic solvents may be used, including but not limited to methanol, ethanol, acetic acid, formic acid, propionic acid, dimethylformamide (DMF), dimethyl sulfoxide (DMSO), and glycerol. In a preferred embodiment, DMF is used as the organic solvent.

In some embodiments, the mixture including PVDF, LiCl and DMF is continuously agitated at 170 rpm for 20-27 hours (h), preferably 20.5-26.5 h, preferably 21-26 h, preferably 21.5-25.5 h, preferably 22-25 h and preferably 22.5-24.4 h to produce a homogeneous solution with a final PVDF concentration ranging from 15-20 wt. %, preferably 15.5-19.5 wt. %, preferably 16-19 wt. %, preferably 16.5-18.5 wt. %, preferably 17-18 wt. %. In a preferred embodiment, the mixture containing 17 wt. % of PVDF is agitated at 170 rpm for 24 h to ensure uniform dissolution and homogeneous mixing.

At step 54, the method 50 includes casting the PVDF solution on a sandpaper substrate to form a PVDF-coated sandpaper. The PVDF solution may be cast on the sandpaper by various methods, including but not limited to drop-casting, spin-coating, dip-coating, bar coating, spray-coating, and electro-spraying.

In some embodiments, the PVDF solution can be cast on the substrate including glass plates, stainless steel plates, nonwoven fabrics and sandpaper. In a preferred embodiment, the substrate used for casting the PVDF solution is sandpaper. The inherent roughness of the sandpaper provides a textured surface that influences the morphology of the cast membrane.

In some embodiments, the PVDF solution is cast at a thickness of 100-130 μm, preferably 102-128 μm, preferably 103-127 μm, preferably 104-126 μm, preferably 105-125 μm, preferably 106-124 μm, preferably 107-123 μm, preferably 108-122 μm and preferably 109-121 μm. In a preferred embodiment, the PVDF solution is cast at a thickness of 120 μm.

At step 56, the method 50 includes immersing the PVDF-coated sandpaper in a mixture of water and isopropanol to form a PVDF membrane-coated sandpaper having a PVDF layer with a non-textured surface on the top and a textured surface in contact with the sandpaper substrate.

In some embodiments, the mixture includes water and isopropanol in ratio by volume of 3-5:0.2-1.5, preferably 3.2-4.8:0.3-1.4, preferably 3.6-4.5:0.4-1.3, preferably 3.8-4.2:0.5-1.2 and preferably 3.9-4.1:0.8-1.1. In a preferred embodiment, the mixture includes water and IPA in a 4:1 ratio by volume.

In some embodiments, the PVDF membrane coated sandpaper is cleaned with water for a duration of 20-26 (h), preferably 20.5-25.5 h, preferably 21-25 h and preferably 21.5-24.5 h, preferably 23-24 h and finally dried at room temperature. In a preferred embodiment, the PVDF membrane coated on sandpaper is cleaned using distilled water for 24 h. In other embodiments, the water may be tap water, distilled water, bi-distilled water, deionized water, double deionized water, deionized distilled water, reverse osmosis water, and/or some other water.

At step 58, the method 50 includes electrospraying an intermediate solution including DMF, CuO nanoparticles and a polymer onto the non-textured surface of the PVDF membrane, followed by isolating a two-layer membrane from the sandpaper substrate.

In some embodiments, the polymer is at least one polymer selected from vinylidene fluoride and hexafluoropropylene copolymer (PVDF-HFP) and polyacrylonitrile (PAN). In other embodiments, the polymers may include polyethylene (PE), polypropylene (PP), polytetrafluoroethylene (PTFE), polysulfone (PSf), polyethersulfone (PES), cellulose acetate (CA), polyimide (PI), polycarbonate (PC), and polymethyl methacrylate (PMMA).

In some embodiments, the intermediate solution is prepared by mixing CuO nanoparticles and PVDF-HFP in a DMF solvent where the ratio of the CuO and the PVDF-HFP ranges from 3-6:4-7 wt. %, preferably 3.2-5.9:4.5-6.9 wt. %, preferably 3.4-5.5:4.7-5.5 wt. % and preferably 4-5.2:4.9-5.3 wt. %. In another embodiment, the intermediate solution is prepared by mixing CuO nanoparticles and PAN in a DMF solvent where the ratio of the CuO and the PAN ranges from 3-6:4-7 wt. %, preferably 3.2-5.9:4.5-6.9 wt. %, preferably 3.4-5.5:4.7-5.5 wt. % and preferably 4-5.2:4.9-5.3 wt. %. In a preferred embodiment, the method includes electrospraying the intermediate solutions of 5:5 wt. % CuO nanoparticles with PVDF-HFP and 5:5 wt. % CuO nanoparticles with PAN onto the non-textured surface of the PVDF membrane, thereby forming two-layer membranes and isolating them from the sandpaper substrate.

In some embodiments, the two-layer membranes can be isolated from the sandpaper by various methods, including careful peeling, solvent-assisted detachment, using a backing film for support, immersing in water to reduce adhesion and applying thermal treatment to ease separation.

At step 60, the method 50 includes mounting the two-layer membrane-coated sandpaper onto a rotating drum having an aluminum foil substrate, where the textured surface of the PVDF is in contact with the aluminum foil substrate.

In some embodiments, the two-layer membrane can be mounted on a rotating drum by several methods, including directly fixing the membranes using adhesive tapes or clips at the edges or wrapping the membranes tightly around the drum and securing with clamps. In some embodiments, vacuum suction or electrostatic adhesion can be employed to hold the membrane in place and for delicate membranes, a supporting layer or frame can first be attached to the drum, onto which the membrane is mounted to prevent damage or wrinkles.

In some embodiments, the rotating drum can be covered with alternative substrates such as stainless-steel foil, copper foil, conductive carbon cloth, graphite sheet and flexible polymer films like PET or PI coated with a conductive layer. In a preferred embodiment, the rotating drum has an aluminum substrate.

At step 62, the method 50 includes electrospinning a plurality of PEI fibers from a PEI solution onto the two-layer membrane to form a three-layer membrane where the PEI solution includes PEI and N-methyl-pyrrolidone.

In some embodiments, dissolution of the PEI solution may be facilitated by continuous stirring at room temperature, mild heating to enhance solubility, or ultrasonication to achieve a homogeneous solution. In a preferred embodiment, the PEI solution is prepared by dissolving PEI and N-methyl-pyrrolidone.

In some embodiments, electrospinning is conducted for duration of 1-5 h, preferably 1.5-4.5 h, preferably 2-4 h and 2.5-3.5 h with a flow rate of 0.50-1.5 mL/h, preferably 0.75-1.40 mL/h and preferably 0.80-1.20 mL/h, a voltage of 10-15 kV, preferably 10.5-14.5 kV, preferably 11-14 kV and preferably 11.5-13.5 kV and a drum rotation speed of 80-120 rpm, preferably 85-115 rpm and preferably 90-110 rpm. In a preferred embodiment, the PEI solution is electrospun on the two-layer membrane for 3 h at a flow rate of 1.0 mL/h, under a voltage of 13.5 kV and a drum rotation speed of 100 rpm, thereby forming the three-layer membrane.

At step 64, the method 50 includes drying the three-layer membrane to form the multilayer Janus membrane, where the three-layer membrane can be dried in a vacuum oven, a hot air oven, or under ambient conditions until all residual solvent is completely removed.

In a preferred embodiment, thermal treatment is employed to dry all the layers of the Janus membrane.

In another aspect of the present disclosure, a method of water membrane distillation using a multilayer Janus membrane is described. The method includes flowing a saline solution through the multilayer Janus membrane and then absorbing saline on the multilayer Janus membrane to form filtered water. The multilayer Janus membrane includes a PVDF layer, a PEI layer, and an intermediate layer including CuO nanoparticles and at least one polymer selected from PVDF-HFP and PAN. The intermediate layer includes a plurality of granular particles and is in contact and is between the PVDF layer and the PEI layer. The PEI fibers interlock between the granular particles of the intermediate layer.

In some embodiments, the saline solution includes saline at a concentration of 1-70,000 ppm, preferably 1000-60,000 ppm, preferably 10,000-50,000 ppm, preferably 20,000-40,000 ppm, preferably 30,000-35,000 ppm, preferably 31,000-34,000 ppm, preferably 32,000-33,000 ppm and preferably 32,500-33,000 ppm. In a preferred embodiment, the saline solution concentration is 70,000 ppm.

In some embodiments, the multilayer Janus membrane has a flux of 30-40 $kg \cdot m^{-2} \cdot h^{-1}$, preferably 30.5-39 $kg \cdot m^{-2} \cdot h^{-1}$, preferably 31-38.5 $kg \cdot m^{-2} \cdot h^{-1}$, preferably 31.5-38 $kg \cdot m^{-2} \cdot h^{-1}$, preferably 32-37.5 $kg \cdot m^{-2} \cdot h^{-1}$, preferably 32.5-37 $kg \cdot m^{-2} \cdot h^{-1}$ and preferably 33-36.5 $kg \cdot m^{-2} \cdot h^{-1}$ where the flowing of the saline solution through the Janus membrane is for a duration of 1 to 60 h. In a preferred embodiment, the multilayer Janus membrane displays a flux of 37 $kg \cdot m^{-2} \cdot h^{-1}$ when the saline solution is flowed through it for a duration of 60 h.

In some embodiments, the multilayer Janus membrane having a constant saline rejection rate with no decline, where the absorbing has a duration of 1-60 h, preferably 2-55 h, preferably 4-50 h, preferably 6-45 h, preferably 10-40 h, preferably 15-35 h, preferably 20-30 h, preferably 22-28 h, preferably 23-27 h, preferably 24-26 h and preferably 25 to 26 h.

In some embodiments, the multilayer Janus membrane has a saline rejection rate of at least 99%, preferably at least 99.10%, preferably at least 99.20%, preferably at least 99.30%, preferably at least 99.40%, preferably at least 99.50%, preferably at least 99.60%, preferably at least 99.70%, preferably at least 99.80% and preferably at least 99.90% when the absorption has a duration of 1-60 hours. In a preferred embodiment, the multilayer Janus membrane achieves a saline rejection rate of 99.97% over an absorption period of 60 h.

The following examples are provided solely for illustration and are not to be construed as limitations of the present disclosure, as many variations thereof are possible without departing from the spirit and scope of the present disclosure.

EXAMPLES

The following examples demonstrate a method of fabricating a multilayer Janus membrane (also referred as Janus membrane) having a polyvinylidene fluoride (PVDF) layer, an intermediate layer and a polyetherimide (PEI) layer. The examples are provided solely for illustration and are not to be construed as limitations of the present disclosure, as many variations thereof are possible without departing from the spirit and scope of the present disclosure.

Example 1: Materials

Polyvinylidene fluoride (PVDF) (molecular weight ~534,000 by GPC, powder), polyetherimide (PEI), lithium chloride (LiCl) (≥99.98 trace metal basis), copper (II) oxide (CuO) (nanofiller, <50 nm particle size), poly (vinylidene fluoride-co-hexafluoropropylene) (PVDF-HFP) (Mw~400,000), poly (acrylonitrile) (PAN) (Mw~150000), Dimethylformamide (DMF, 99.9%), N-methyl-pyrrolidone (NMP), and 2-propanol (Isopropanol, 99.9%) were all purchased from Sigma-Aldrich and used without any modifications. De-ionized water from a laboratory-sized Millipore system (Milli-Q Academic) was used in membrane fabrication and testing.

Example 2: Methods

A predetermined amount of PVDF powder was weighed and oven-treated at 60° C. for 1 hour to eliminate any residual moisture. From this treated powder, 3.4 g was measured and added to a 2 wt. % LiCl solution prepared in DMF. The mixture was continuously agitated at 170 rpm for 24 hours to produce a homogeneous dope solution with a final PVDF concentration of 17 wt. %. The resulting dope solution was allowed to degas at room temperature before being cast on sandpaper casting substrate using a doctor blade. To ensure efficient phase separation, the solution was cast at a thickness of 120 μm and immediately immersed in a coagulation bath containing a warm water-isopropanol mixture (80:20 v/v). After successful phase inversion, the membrane was cleaned in deionized (DI) water for 24 hours while still attached to the substrate to remove residual solvents (FIG. 2A). After drying at room temperature, the resulting membrane, referred to as M1, was subsequently detached from the sandpaper substrate for further processing. This method of using sandpaper casting substrate provided uniform flat sheet unsupported porous membrane as reported in other studies.

Example 3: Multilayer Membrane Fabrication

The fabricated single-layer flat-sheet membrane, designated as M1, was placed on a flat plate with the textured/rough side facing down. A composite solution, prepared by mixing CuO and PVDF-HFP in a 5:5 wt. % ratio in a DMF solvent, was loaded into a 10 ml syringe for electro-spraying. The solution was sprayed for 15 minutes at a high voltage of 22.0 kV and a flow rate of 1.5 mL/h. The 15-minute spraying duration was determined as optimal based on wettability investigation conducted at intervals of 15, 30, and 60 minutes. After spraying, the resulting membrane, labeled M2, was dried in an oven at 60° C. Similarly, another membrane (M3) was fabricated using the same spraying conditions but with a composite solution of PAN and CuO in the same 5:5 wt. % ratio.

For the support layer deposition, membranes M1, M2, and M3 were subsequently mounted onto a rotating drum covered with aluminum foil in an electrospinning apparatus to create Janus membranes. The membranes obtained after electrospinning were labeled as M4 (PVDF-PH/CuO-PEI), M5 (PVDF-PAN/CuO-PEI), and M6 (PVDF/PEI) respectively. A 20 wt. % PEI solution, prepared by dissolving 2.0 g of PEI polymer in 8.0 g of NMP, was used for fiber spinning. Electrospinning was conducted for 3 hours with the following parameters: a flow rate of 1.0 mL/h, a voltage of 13.5 kV, and a drum rotation speed of 100 rpm (FIG. 2B). The spraying and spinning conditions were kept consistent for all membranes (M2, M3, M4, M5, and M6). Finally, thermal treatment was employed to dry all the layers of the Janus membrane. A summary of the fabricated membranes and their compositions is provided in Table 1. To evaluate the role of the interfacial layer, the M6 membrane was fabricated with a structure like M4 and M5 but without the interfacial composite layer.

TABLE 1

Composition of different membranes present in the Janus membrane

| Membrane | Composition | Hydrophobic layer (wt. %) | Intermediate layer (wt. %) | Hydrophilic layer (wt. %) |
|---|---|---|---|---|
| M1 | Flat sheet PVDF | PVDF | | |
| M2 | PVDF-PH/CuO | PVDF | PVDF-HFP + CuO | |
| M3 | PVDF-PAN/CuO | PVDF | PAN + CuO | |
| M4 | PVDF-PH/CuO-PEI | PVDF | PVDF-HFP + CuO | PEI |
| M5 | PVDF-PAN/CuO-PEI | PVDF | PAN + CuO | PEI |
| M6 | PVDF/PEI | PVDF | — | PEI |

Example 4: Membrane Characterization

The surface morphology of all membrane layers was analyzed using scanning electron microscopy (SEM, JEOL JSM-6610LV). To further investigate the elemental composition of the membrane layers, energy-dispersive spectroscopy (EDS) was conducted in conjunction with SEM. Additionally atomic force microscopy (AFM) (Nanosurf) was also used to evaluate the membrane surface topography and surface roughness. The chemical composition of the membrane surfaces was characterized by Fourier transform infrared (FT-IR) spectroscopy (Bruker INVENIO series). FT-IR spectra were recorded within the wavenumber range of 600-4000 cm$^{-1}$ to identify characteristic peaks associated with membrane surfaces. Furthermore, the interfacial polarizable characteristics were studied using the X-ray diffraction (XRD) (Rigaku Ultima IV). The wettability of the membrane surfaces was evaluated using water contact angle (WCA) measurements. The WCA was determined using the sessile drop method, where approximately 5 µL of water droplets were dispensed at multiple locations on each membrane surface. The contact angle was measured by illuminating the droplet with soft white light on one side and capturing its profile using a high-resolution monochromatic camera. The average water contact angle was calculated based on measurements taken at several points on the membrane surface.

Example 5: Membrane Bulk Properties

The hydrophobicity of fabricated membranes was also assessed through liquid entry pressure (LEP) using a custom laboratory setup designed to measure the penetration pressure of water. The LEP was determined by gradually applying pressure to an enclosed water chamber in contact with the membrane surface, following the methodology described by Smolder and Franklin [See: B. M. Alotaibi, R. Altuijri, A. Atta, E. Abdeltwab, and M. M. Abdelhamied, "*Fabrication, structure and optical characteristics of CuO polymer nanocomposites materials for optical devices,*" *International Journal of Polymer Analysis and Characterization*, vol. 29, no. 7, pp. 562-572, October 2024, which is incorporated herein by reference in its entirety]. The LEP corresponds to the minimum pressure at which water penetrates the membrane pores and forms visible droplets on the opposite side. The membrane thickness was measured using a LITEMATIC VL-50A precision measurement device (Mitutoyo, Japan) to ensure accuracy and consistency. The pore size distribution (PSD) of the membranes was analyzed using a porometer (3 Gzh, Quantachrome Instruments, USA). The measurement involved forcing ethanol out of the membrane pores with controlled gas pressure, allowing the PSD to be determined. A discovery hybrid rheometer HR30 from TA instrument with a tensile deformation module was used the assess the mechanical stability of developed membranes. Samples were clamped meticulously and tested at a constant rate of 50 µ/sec.

Figure 3A:
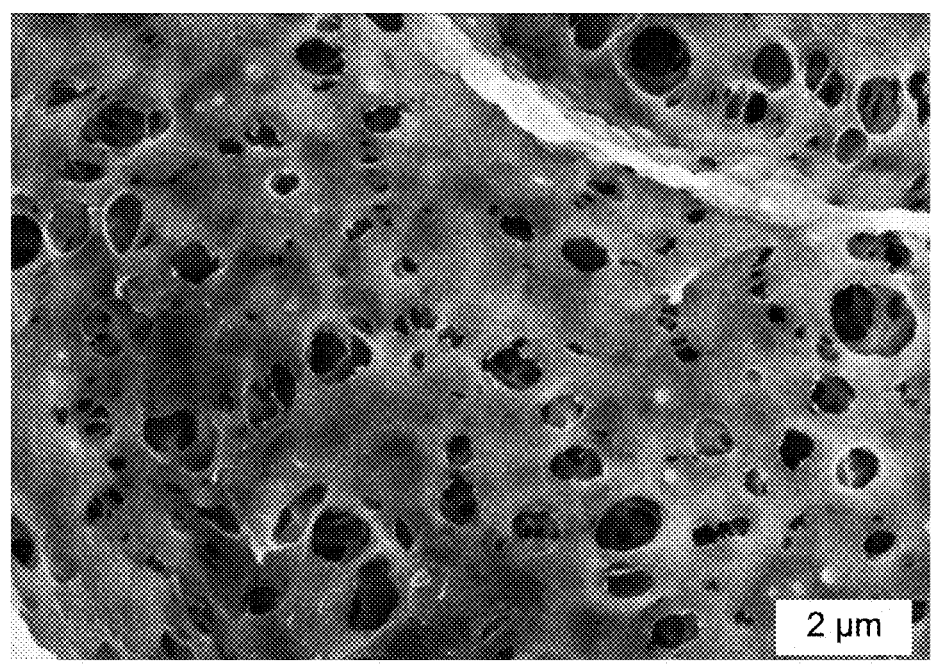
FIG. 3A shows a scanning electron microscopy (SEM) image of a single PVDF membrane having a textured surface and a non-textured surface (M1 membrane) with a scale bar of 2 μm, according to certain embodiments.
Figure 3B:
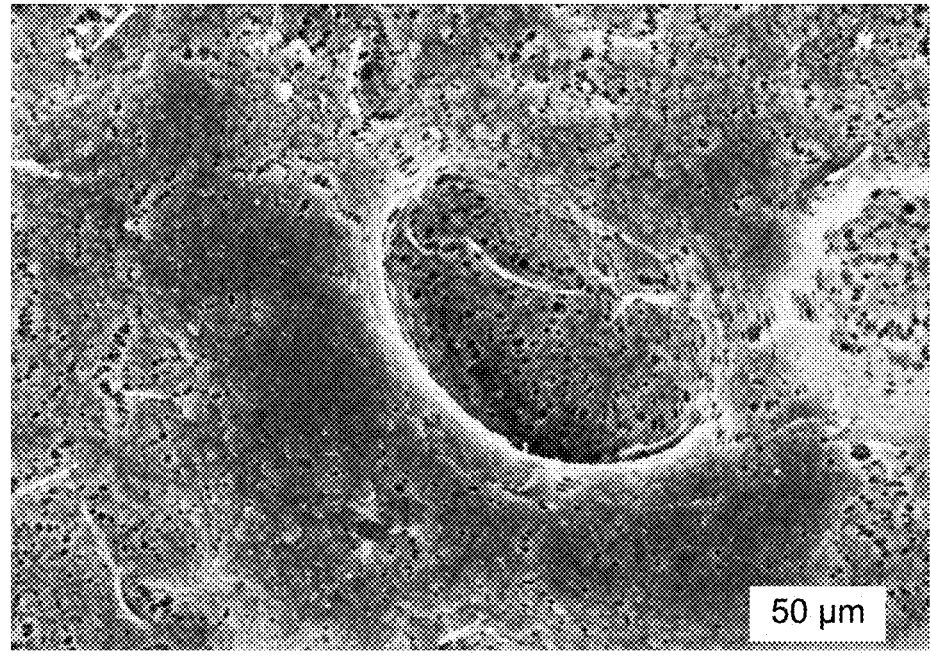
FIG. 3B shows a SEM image of the M1 membrane with a scale bar of 50 μm, according to certain embodiments.
Figure 3C:
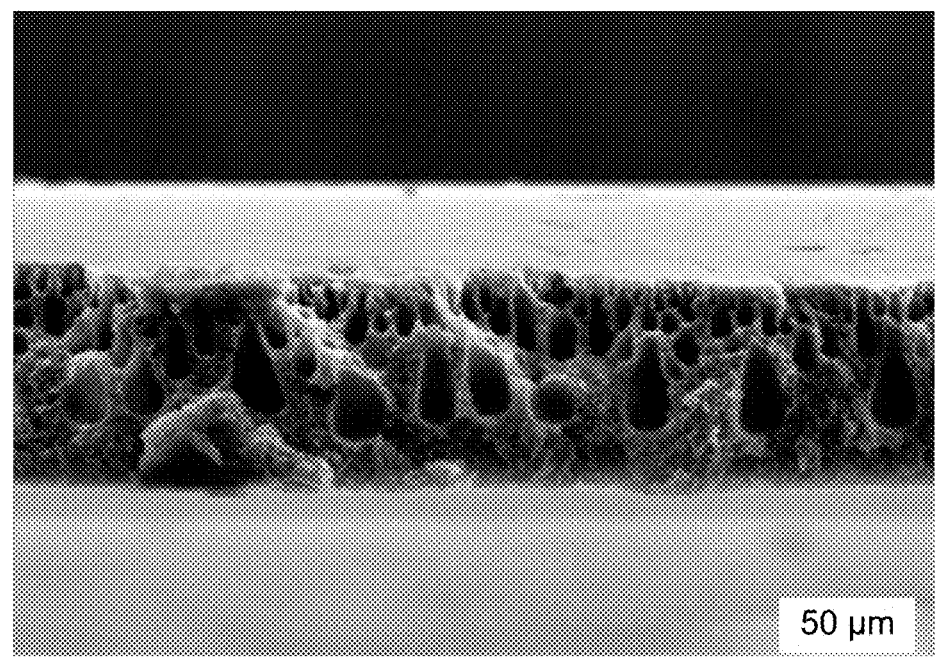
FIG. 3C shows a cross-sectional SEM image of the M1 membrane with a scale bar of 50 μm, according to certain embodiments.
Figure 3D:
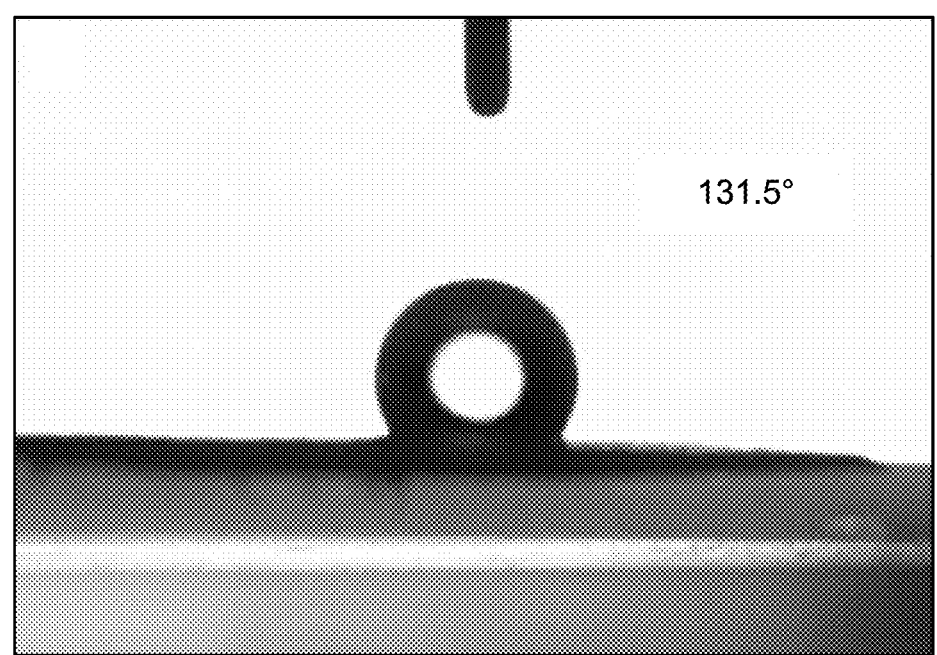
FIG. 3D shows an image of water contact angle (WCA) measured on the textured surface of the M1 membrane, showing a contact angle of 131.5°, according to certain embodiments.

The objective of the present disclosure is to integrate an interfacial layer that physically joins a Janus membrane's active hydrophobic layer and hydrophilic support layer. To optimize separation performance, the membrane interface is engineered to reduce mass transfer resistance and increase layer-to-layer adhesion. In the past, capillary action was thought to be responsible for Gecko foot adhesion, and the Young-Dupré equation was linked to adhesion energy (W) [See: K. Autumn et al., "*Adhesive force of a single gecko foot-hair,*" *Nature*, vol. 405, no. 6787, pp. 681-685, June 2000, which is incorporated herein by reference in its entirety]. According to Young's equation, the water contact angle (WCA) and adhesion energy are inversely related, with higher θ values denoting less adhesion. This theory was later disproved, though, because while diverse surfaces like glass and Gecko feet have different adhesion despite their wettability, identical surfaces show equal wettability. This disparity was explained by additional research, which revealed that Gecko adhesion is unaffected by surface chemistry or WCA. Rather, it relies on surface area and van der Waals interactions. Gecko adhesion strength is determined by the surface area of interaction rather than surface chemistry or wettability, according to a hydrophobic and hydrophilic polarizable physical surface model [See: K. Autumn et al., "*Evidence for van der Waals adhesion in gecko setae,*" *Proceedings of the National Academy of Sciences*, vol. 99, no. 19, pp. 12252-12256, September 2002, which is incorporated herein by reference in its entirety]. This present disclosure develops an interfacial layer with "Gecko-state" wettability by simulating the hydrophobic nature and high surface roughness of Gecko feet. The goal of this design is to improve the physical interactions between the Janus membrane's support hydrophilic and active hydrophobic layers. A composite solution was electro-sprayed onto the PVDF membrane (M1) skin surface to deposit interfacial layer for the hydrophilic support. The morphology of the membrane fabricated via NIPS technique is dependent on several factors, such as the solvent, the concentration of the polymer, the mixing thermodynamics, and the precipitation kinetics. Depending on the substrate, the morphology of the PVDF layer varies most especially in the case of immersion precipitation [See: G. R. Guillen, Y. Pan, M. Li, and E. M. V. Hoek, "*Preparation and Characterization of Membranes Formed by Nonsolvent Induced Phase Separation: A Review,*" *Ind Eng Chem Res*, vol. 50, no. 7, pp. 3798-3817 April 2011, which is incorporated herein by reference in its entirety]. Specifically, as seen in FIGS. 3A and 3B the rough surface of membrane M1 caused by sandpaper displayed uneven textures with deep basins. The substrate's abrasive effect produced these basins, which resulted in a highly porous surface with open pores. Phase exchange processes can be accelerated by such surface features because they increase the surface area available for solvent-nonsolvent exchange, forming more troughs and locations for water ingress [See: M. A. Azeem, D. U. Lawal, H. Al Abdulgader, and T. N. Baroud, "*Enhanced performance of superhydrophobic polyvinylidene fluoride membrane with sandpaper texture for highly saline water desalination in air-gap membrane distillation,*" Desalination, vol. 528, p. 115603, April 2022; T. N. Baroud, "*Tuning PVDF Membrane Porosity and Wettability Resistance via Varying Substrate Morphology for the Desalination of Highly Saline Water,*" Membranes (*Basel*), vol. 13, no. 4, p. 395, March 2023, which is incorporated herein by reference in its entirety]. The cross-sectional image of M1 membrane as shown in FIG. 3C showed the finger-like characteristics of NIPS membranes with re-entrant structures [See: M. Chen, Q. Sun, Y. Zhou, Z. Cui, Z. Wang, and W. Xing, "*Preparation of PVDF membrane via synergistically vapor and non-solvent-induced phase separation,*" Appl Water Sci, vol. 12, no. 7, p. 161, July 2022, which is incorporated herein by reference in its entirety]. This structure forms due to thermodynamic instabilities at the solvent-nonsolvent interface near the substrate during immersion in the coagulation bath. Rapid solvent diffusion into the nonsolvent phase initiates pore nucleation, while interactions between the pore-former (LiCl) and the nonsolvent influence pore interconnectivity and the resulting finger-like structure [See: L. Zheng, Z. Wu, Y. Zhang, Y. Wei, and J. Wang, "*Effect of non-solvent additives on the morphology, pore structure, and direct contact membrane distillation performance of PVDF-CTFE hydrophobic membranes,*" Journal of Environmental Sciences, vol. 45, pp. 28-39, July 2016, which is incorporated herein by reference in its entirety]. A uniform thin unsupported PVDF membrane with rough and porous surface depicting water contact angle of 131.5° (FIG. 3D) was obtained with the help of sand paper casting substrate, suitable for secondary layer deposition.

Figure 4A:
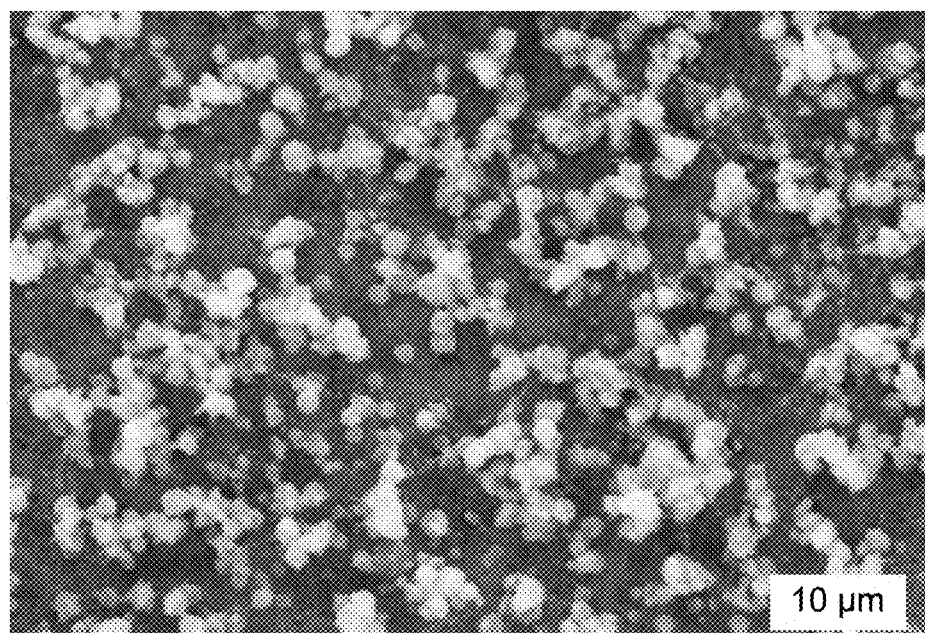
FIG. 4A shows a SEM image of a membrane having an intermediate layer comprising CuO nanoparticles and vinylidene fluoride and hexafluoropropylene copolymer (PVDF-HFP) deposited on the non-textured surface of the M1 membrane (M2 membrane) with a scale bar of 10 μm, according to certain embodiments.
Figure 4B:
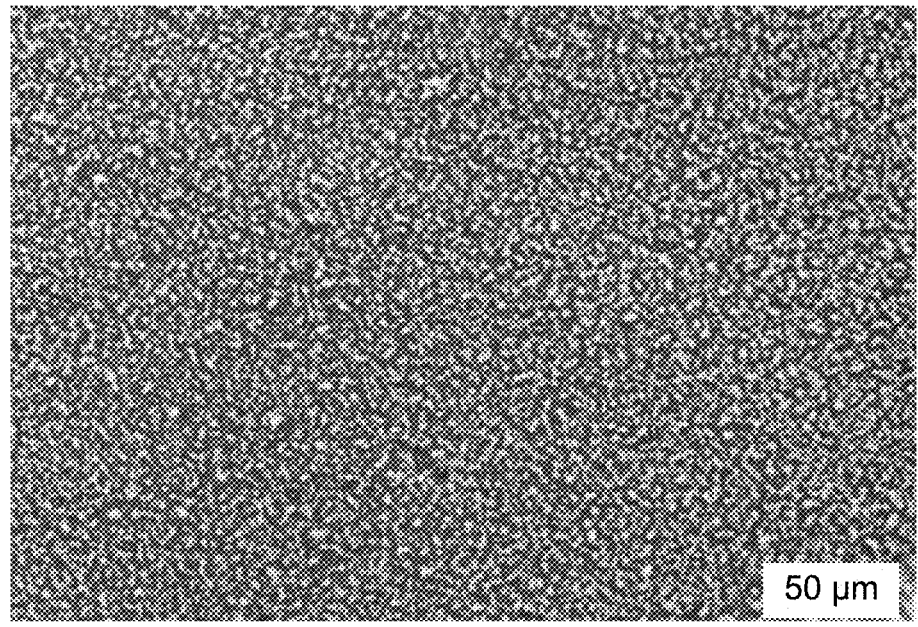
FIG. 4B shows a SEM image of the M2 membrane with a scale bar of 50 μm, according to certain embodiments.
Figure 4C:
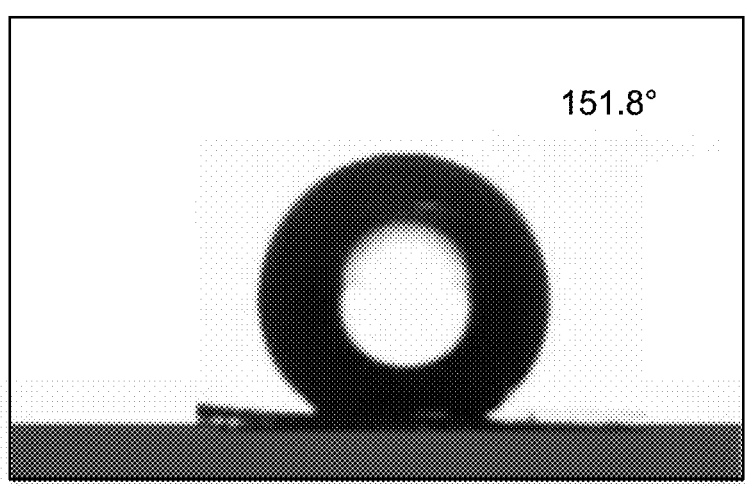
FIG. 4C shows an image of WCA measured on the intermediate layer of the M2 membrane, showing a contact angle of 151.8°, according to certain embodiments.
Figure 4D:
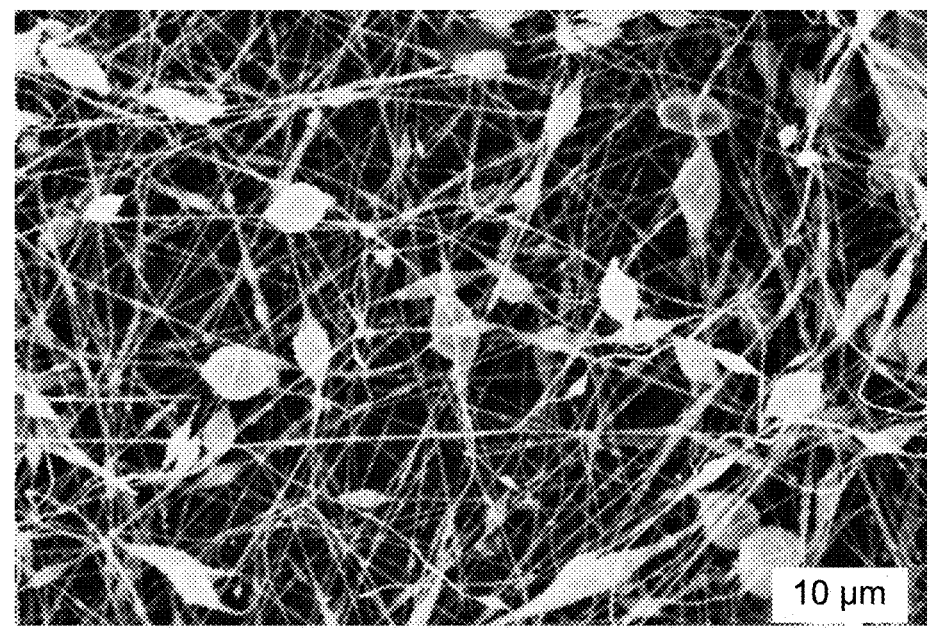
FIG. 4D shows a SEM image of a membrane having an intermediate layer comprising CuO nanoparticles and poly-acrylonitrile (PAN) deposited on the non-textured surface of the M1 membrane (M3 membrane) with a scale bar of 10 μm, according to certain embodiments.
Figure 4E:
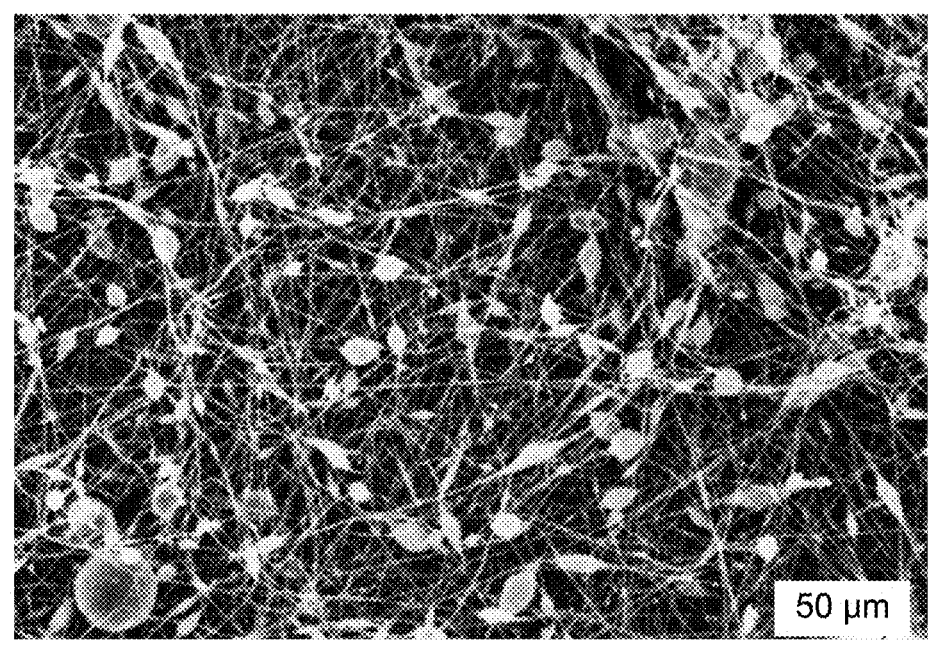
FIG. 4E shows a SEM image of the M3 membrane with a scale bar of 50 μm, according to certain embodiments.
Figure 4F:
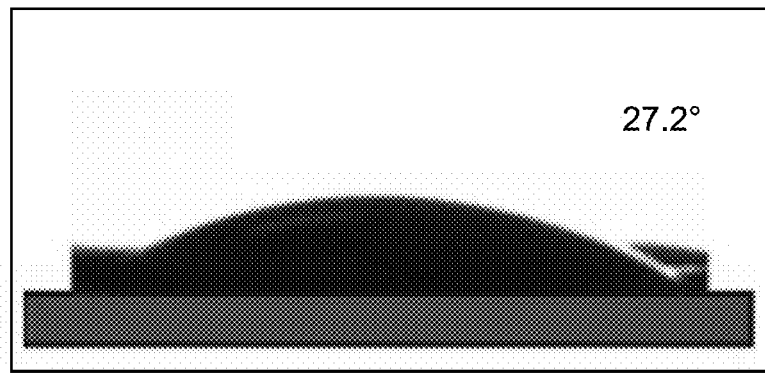
FIG. 4F shows an image of WCA measured on the intermediate layer of the M3 membrane, showing a contact angle of 27.2°, according to certain embodiments.

As shown in FIG. 2B, subsequent electro-spraying and electrospinning techniques were employed to develop the Janus multilayer membranes. As a result, the other side of membrane surface M1 (skin side) has undergone various morphological changes as depicted in FIGS. 4A-4C. Typically, after electrospraying the surface of the flat sheet membrane exhibited pronounced roughness, characterized by granular and spherical features with uniform particle distribution (FIGS. 4A and 4B). The granular particles also demonstrated uneven height distribution, a surface characteristic closely mimicking the tiny bristle structure of Gecko feet. The superhydrophobic nature of this surface is shown in FIG. 4C, confirmed through contact angle of water droplet. In contrast the intermediate layer involving hydrophilic additive (PAN+CuO) in M3 membrane demonstrated particle distribution in fibrous morphology providing roughness and hydrophilic surface characteristic (FIGS. 4D-4F). The presence of microscale gaps and surface roughness facilitates air trapping and mechanical locking between the membrane surfaces.

Figure 4G:
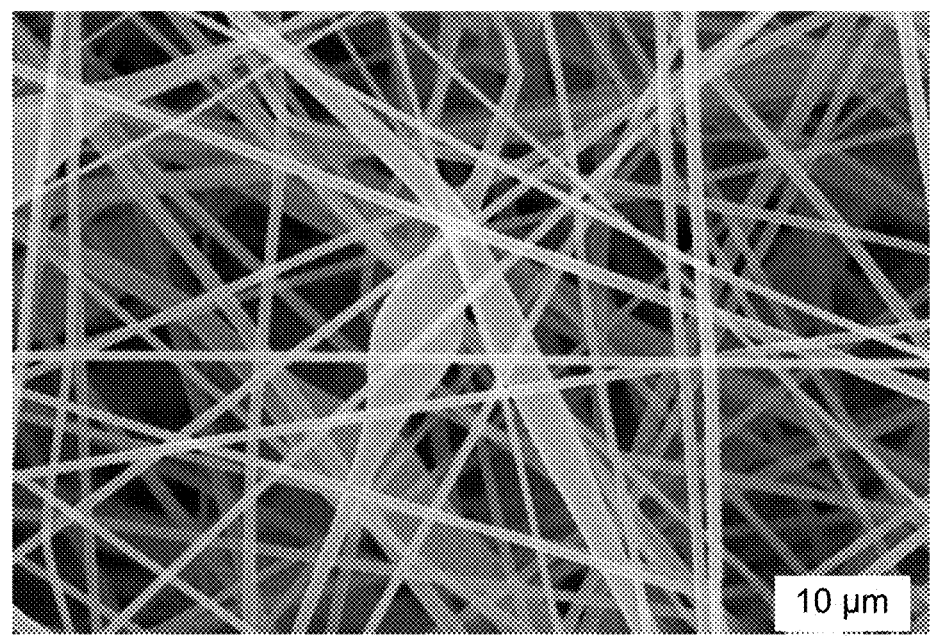
FIG. 4G shows a SEM image of a membrane having PEI fibers electro-spun on the intermediate layer of the M2 membrane (M4 membrane), a membrane having PEI fibers electro-spun on the intermediate layer of the M3 membrane (M5 membrane) and a membrane having PEI fibers electro-spun on the non-textured surface of the M1 membrane (M6 membrane) with a scale bar of 10 μm, according to certain embodiments.
Figure 4H:
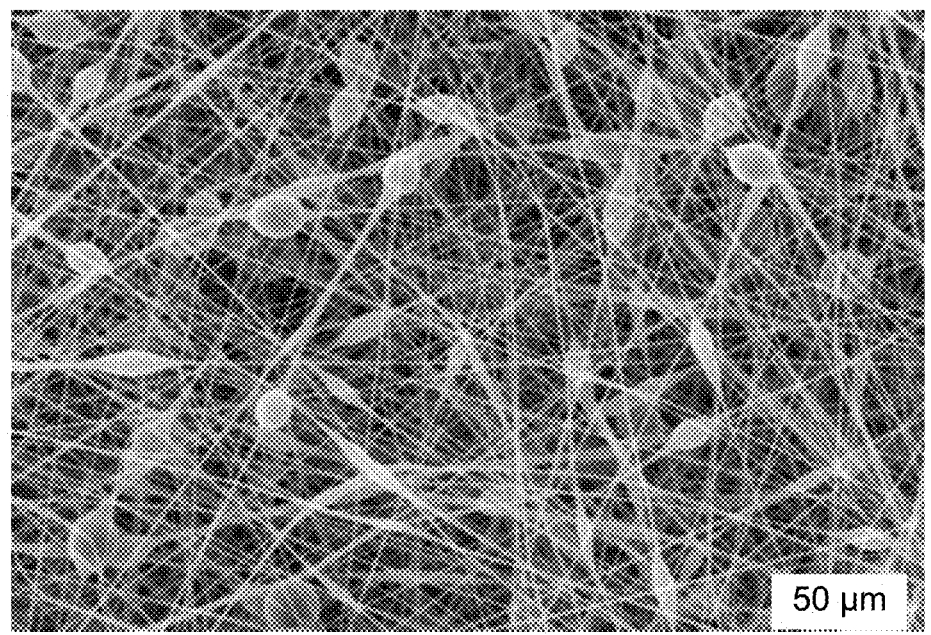
FIG. 4H shows a SEM image of M4, M5 and M6 membrane with a scale bar of 50 μm, according to certain embodiments.
Figure 4I:
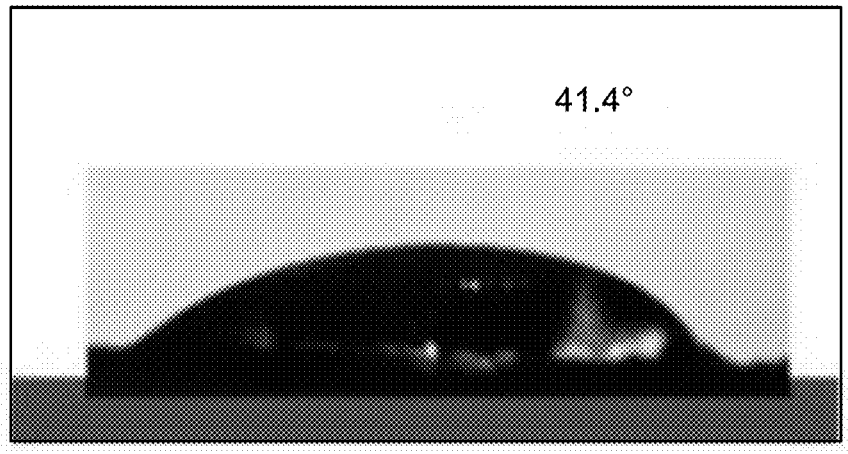
FIG. 4I shows an image of WCA measured on the PEI fibers surface of the M4, M5 and M6 membrane, showing a contact angle of 41.4°, according to certain embodiments.

Building on these results, the support layer was deposited by electrospinning polyetherimide (PEI) fibers onto the M1, M2 and M3 membrane surfaces, followed by thermal treatment. This sequential process produced a Janus multilayer membrane, designated as M6, M4 and M5 respectively. The M4 membrane demonstrated a highly interconnected fibrous structure with uniform size distribution, as shown in FIGS. 4G and 4H. Furthermore, the PEI fibers demonstrated hydrophilic affinity from the water contact measured on the fiber surface (FIG. 4I). The M4, M5 and M6 membranes have the same architecture, only that M4 and M5 contains an interfacial/intermediate layer while M6 don't.

The WCA recorded from membranes surfaces depicted in FIG. 3 and FIG. 4 depends on several variables, such as the membrane's surface chemistry, topography, roughness, and surface energy [See: Z. Wu, K. Zheng, G. Zhang, L. Huang, and S. Zhou, "*Preparation of polysulfone-based nanofiber Janus membrane for membrane distillation containing organic pollutants,*" NPJ Clean Water, vol. 7, no. 1, p. 51, June 2024, which is incorporated herein by reference in its entirety]. A PVDF membrane fabricated through NIPS method in water as the coagulation bath exhibits a WCA value of 77° [See: S. Muchtar, M. Y. Wahab, S. Mulyati, N. Arahman, and M. Riza, "*Superior fouling resistant PVDF membrane with enhanced filtration performance fabricated by combined blending and the self-polymerization approach of dopamine,*" Journal of Water Process Engineering, vol. 28, pp. 293-299, April 2019, which is incorporated herein by reference in its entirety]. A glass substrate used to cast PVDF membrane using NIPS conditions in this work showed a WCA of less than 90 degrees. The developed membrane (M1) precipitated using a mixture of non-solvents on a sandpaper substrate displayed a significantly greater WCA of about 131.5°. The increase in hydrophobicity is noted indicating the substantial impact of coagulation media and substrate on membrane surface morphology and, consequently, membrane hydrophobicity [See: M. Namdari, F. Zokaee Ashtiani, and E. Bonyadi, "*Development of a high flux Janus PVDF membrane for oily saline water desalination by membrane distillation via PDA-TEOS-APTES surface modification,*" Desalination, vol. 572, p. 117139, March 2024, which is incorporated herein by reference in its entirety]. The mimicked rough surface of M2 displayed a superhydrophobic nature with WCA angle of 151.8°, which gives this surface the ability to "self-clean", a similar characteristic of a Gecko-feet. The interaction between the water droplet and the membrane surface in this case shows the Cassie-Baxter state. The WCA was found to decrease with increase in spraying time. Because of the PAN and CuO particles synergistic influence, the M3 surface displayed a hydrophilic character with a WCA value of 27.2°, whereas the WCA angle of the bottom PEI fiber layer in M4, M5 and M6 showed a value of 41.4° depicting Wenzel state due to the roughness induced by the fibers.

Figure 5A:
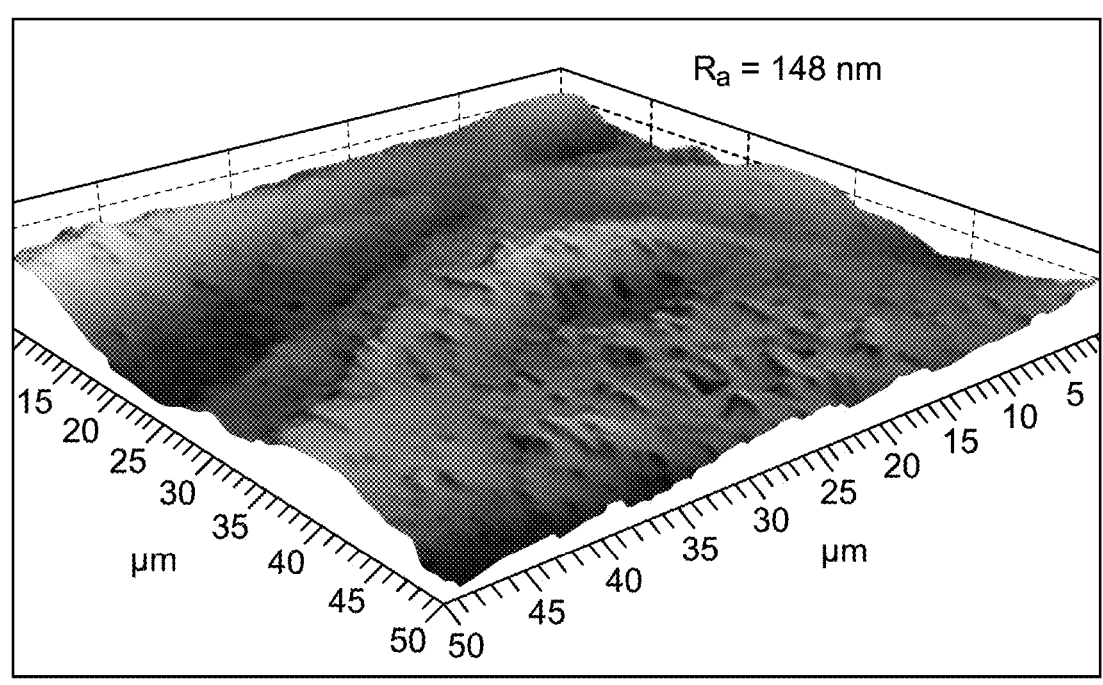
FIG. 5A shows an atomic force microscope (AFM) surface topography image of the textured surface of the M1 membrane, according to certain embodiments.

To confirm the surface roughness on critical surfaces of the membranes responsible for hydrophobicity and interfacial adhesion, the average surface roughness ($R_a$) was obtained from the AFM imaging over a given sampling length. This value was related to the microporous structure and uniformity on the surface of the membranes [See: Z. Hosseini and A. Kargari, "*Fabrication and characterization of hydrophobic hydrophilic dual-layer polyphenyl sulfone Janus membrane for application in direct contact membrane distillation,*" Desalination, vol. 571, p. 117100, February 2024, which is incorporated herein by reference in its entirety]. From FIG. 5A, MI was discovered to have a $R_a$ value of 148 nm, indicating the influence of sandpaper casting on the surface roughness due to observed textures in SEM images of the membrane in FIGS. 4D and 4E. Although, the values of $R_a$ don't fully explain the dependency of surface roughness on WCA values, the higher roughness in PVDF membrane (M1) is a key point in explaining the higher WCA [See: S. Ghorabi, F. Z. Ashtiani, M. Karimi, A. Fouladitajar, B. Yousefi, and F. Dorkalam, *"Development of a novel dual-bioinspired method for synthesis of a hydrophobic hydrophilic polyethersulfone coated membrane for membrane distillation,"* Desalination, vol. 517, p. 115242, December 2021, which is incorporated herein by reference in its entirety]. However, the surface roughness on M1 membrane introduced water enclosed air pockets, producing an air-water droplet interface which is essentially for increasing the WCA of the surface [See: M. A. Azeem, D. U. Lawal, H. Al Abdulgader, and T. N. Baroud, *"Enhanced performance of superhydrophobic polyvinylidene fluoride membrane with sandpaper texture for highly saline water desalination in air-gap membrane distillation,"* Desalination, vol. 528, p. 115603, April 2022; J. Ravi et al., *"Polymeric membranes for desalination using membrane distillation: A review,"* Desalination, vol. 490, p. 114530, September 2020, which is incorporated herein by reference in its entirety].

Figure 5B:
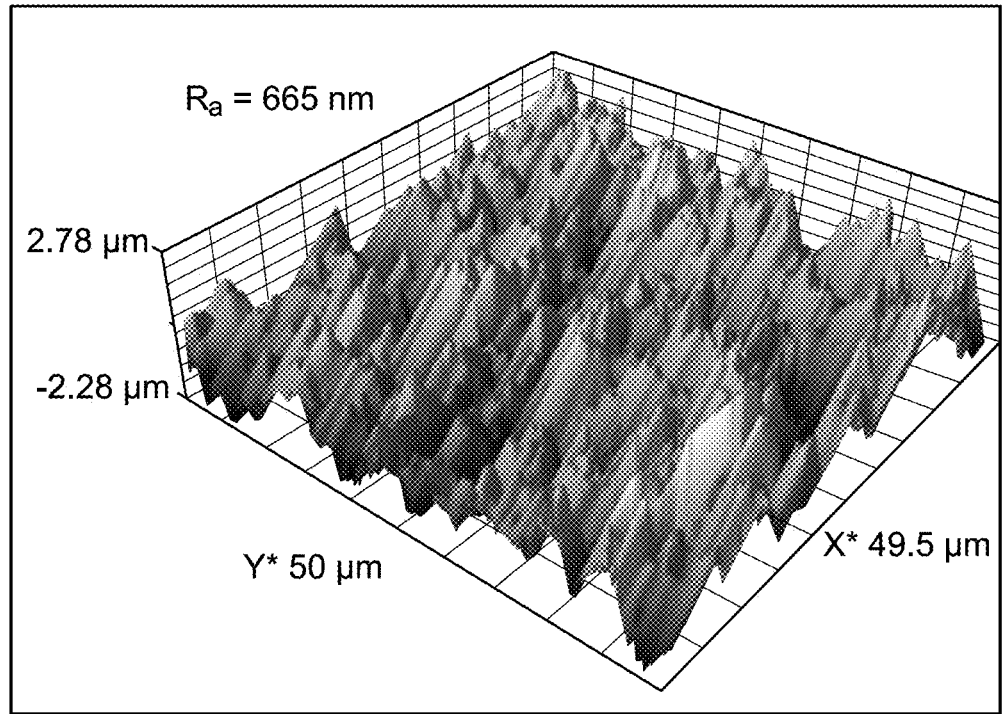
FIG. 5B shows an AFM surface topography image of the intermediate layer surface of the M2 membrane, according to certain embodiments.

The rough morphology of M2 membrane surface was quantitatively supported by the AFM data displayed in FIG. 5B, which shows an average surface roughness ($R_a$) of approximately 665 nm. The potential interfacial area for fiber interlocking is maximized by the textured landscape, depicted in the 3D topographic image. As can be observed, critical surface characteristics are represented by the peaks and valleys in the AFM picture, where fibers can mechanically engage and embed themselves into the granule-formed crevices. The overall adhesion strength is greatly increased because of the synergistic interaction between the surfaces and mechanical interlocking.

Figure 6:
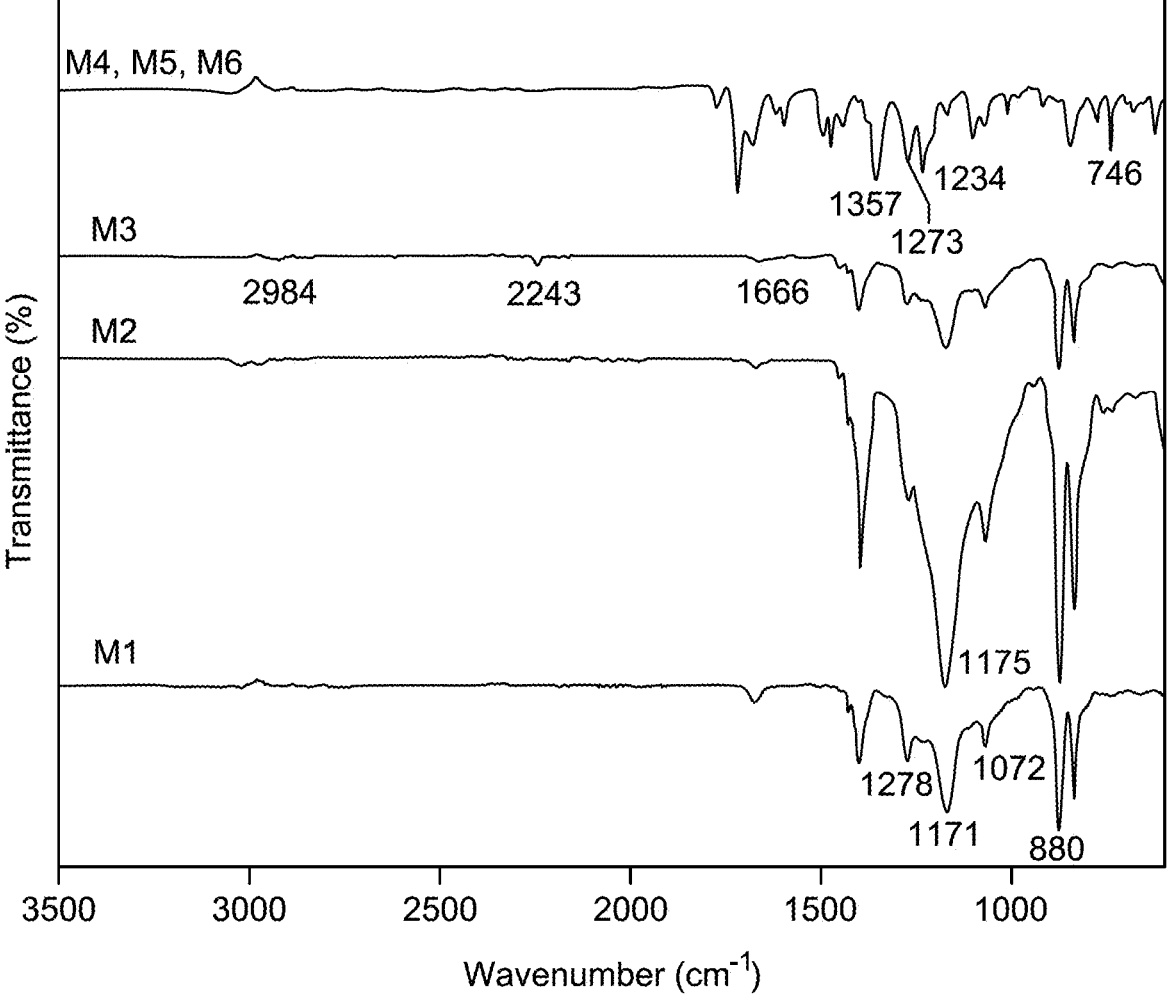
FIG. 6 shows Fourier transform infrared (FT-IR) spectra of the M1, M2, M3, M4, M5 and M6 membranes, according to certain embodiments.
Figure 15:
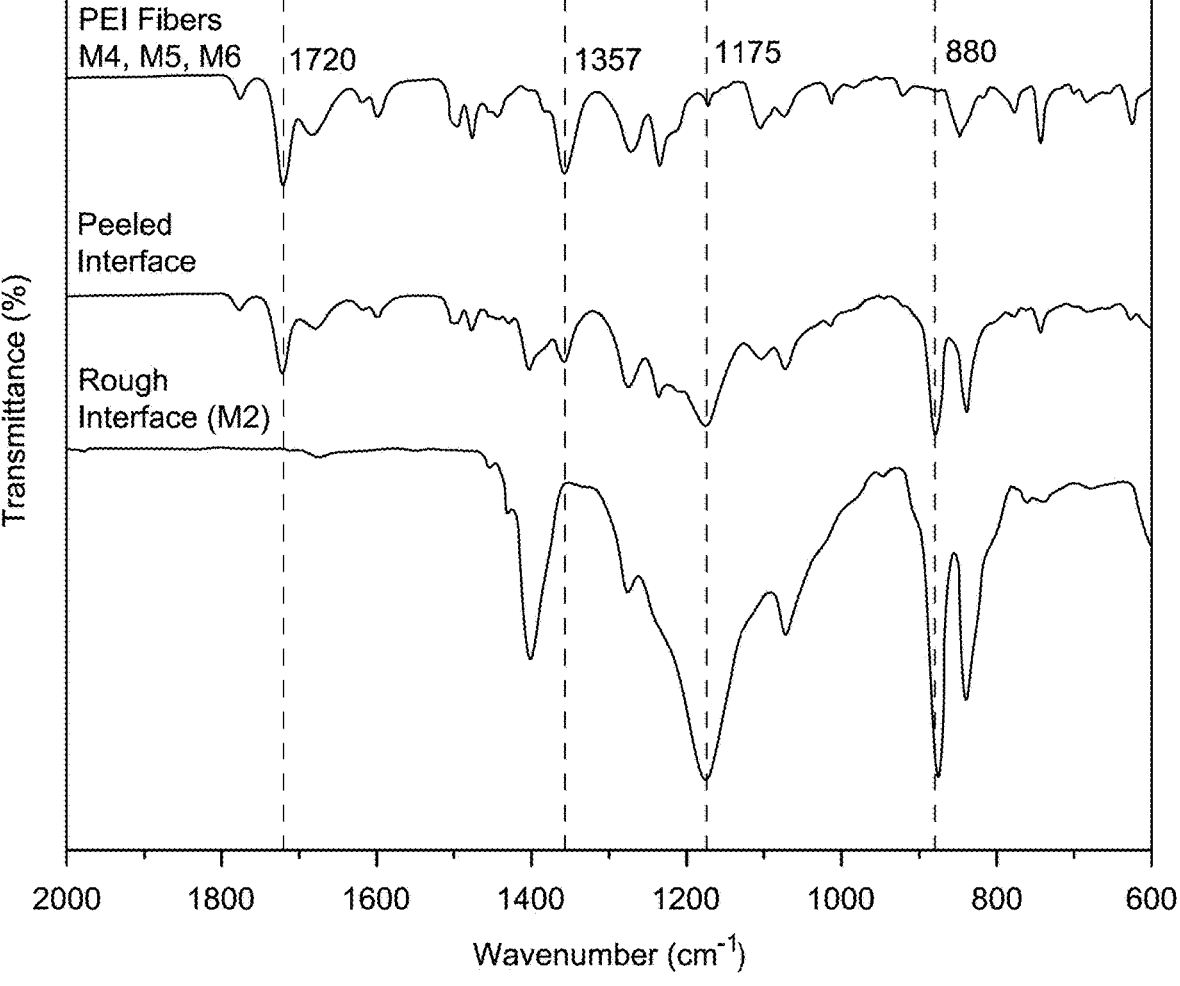
FIG. 15 shows FT-IR spectra comparing a PEI layer of the M4, M5 and M6 membrane, an interlayer of the M4 membrane after the PEI layer is peeled off and the top surface of the M2 membrane, according to certain embodiments.

The FT-IR spectra obtained from various layers of the proposed membrane samples is shown in FIG. 6. The sandpaper cast PVDF membrane represented by M1 and made the top layer and similar at the top for all other membranes. PEI fibers made up the bottom layers in membranes M4, M5 and M6, and the intermediate layers including the M2 and M3 membranes with composites of PVDF-HFP+CuO and PAN+CuO layers respectively. In M1 membrane, the peaks formed at around 1072 cm$^{-1}$ and 1278 cm$^{-1}$ were attributed to the α- and β-phases which are mostly found in PVDF membrane surface fabricated through NIPS method. The highly intense peaks occurring at around 1171 cm-1 corresponds to the C—F bonds which is highly distributed within the polymer chain and the peaks just below 880 cm-1 indicate the presence of C—C bonds [See: Y. Lin et al., *"Development of Janus membrane with controllable asymmetric wettability for highly-efficient oil water emulsions separation,"* J Memb Sci, vol. 606, p. 118141, July 2020; H. Yang et al., *"Janus polyvinylidene fluoride membranes with controllable asymmetric configurations and opposing surface wettability fabricated via nanocasting for emulsion separation,"* Colloids Surf A Physicochem Eng Asp, vol. 616, p. 126120, May 2021, which is incorporated herein by reference in its entirety]. In M2 membrane surface, the peak attributed to —CF$_2$ stretching modes appeared at 1175 cm-1 [See: M. Pyo, K. H. Lee, and E.-J. Lee, *"Enhancing hydrophobicity through polydimethylsiloxane-blended poly (vinylidene fluoride-co-hexafluoropropylene) electrospun membranes: A well-designed approach,"* Polymer (Guildf), vol. 307, p. 127261, July 2024, which is incorporated herein by reference in its entirety]. For a PVDF-HFP, this peak was observed at 1168 cm-1 (FIG. 15). This may be attributed to the interaction between the polymeric matrix and the dispersed CuO, since additives in a polymeric PVDF-HFP matrix may interact with the bonds and result in peaks shift [See: J. Chang and S. W. Kang, *"CO$_2$ separation*

*through poly (vinylidene fluoride-co-hexafluoropropylene) membrane by selective ion channel formed by tetrafluoroboric acid,"* Chemical Engineering Journal, vol. 306, pp. 1189-1192 December 2016, which is incorporated herein by reference in its entirety]. The peak present in at around 2243 cm$^{-1}$ in M3 corresponds to —C≡N of PAN polymer while the vibrations noticed at 2984 and 1666 cm$^{-1}$ are attributed to sp$^3$ C—H and amide group bonds respectively [See: 1. Korkut and E. S. Aydin, *"Electrospun PAN-PS membranes with improved hydrophobic properties for high-performance oil water separation,"* Sep Purif Technol, vol. 331, p. 125590, March 2024; B. Zhang et al., *"Facile synthesis of TiO$_2$-PAN photocatalytic membrane with excellent photocatalytic performance for uranium extraction from seawater,"* Sep Purif Technol, vol. 328, p. 125026, January 2024, which is incorporated herein by reference in its entirety]. However, considering the surfaces of M4, M5 and M6 which are spectra of PEI fibers, stretching and bending motions of —C—N bonds are shown by the peaks at 1359 and 746 cm$^{-1}$. Finally, the different etheric functional groups in polyetherimide are confirmed by the peaks formed at 1273 cm$^{-1}$ and 1235 cm$^{-1}$ [See: J. Wang, L. Nie, C. Zhang, and B. Wang, *"Free radical graft polymerization of hydroxyethyl methacrylate and acrylic acid on polyetherimide membrane surface via redox system to improve anti-fouling and oil resistance performance,"* Mater Today Commun, vol. 38, p. 108197, March 2024, which is incorporated herein by reference in its entirety].

The present disclosure investigated the interaction between the active hydrophobic surface and the support hydrophilic layer of a multi-layer Janus membrane. The weak interaction between the NIPS-cast membrane and the electro-spun PEI layer often results in delamination, compromising the membrane's performance in hypersaline treatment. To address this, a gecko-inspired adhesion mechanism was developed to engineer a robust interface between these layers. To achieve the desired interface properties, a highly porous thin active PVDF surface was developed using substrate-induced NIPS. The interface was further engineered using PVDF-HFP and CuO, leveraging their highly hydrophobic and polarizable nature. Measurements from SEM images using Image J software revealed that the average spacing on the electro-sprayed particles surface was approximately 3.47 μm, while the average diameter of the electrospun PEI fibers was 1.30 μm. This size ratio allowed the M2 surface to effectively accommodate, penetrate, and anchor the nanofibrous layers. The penetration and anchoring of fibers were further facilitated by the strength of the electrospinning potential, which ensures sufficient ejection and deposition force. To validate the importance of surface engineering, the hydrophilic, polarizable membrane (M3) composed of PAN and CuO particles demonstrate possible weak interaction due to the formation of beaded thin fabric structure with high packing irregularities typically due to low concentration and higher operational voltage [See: W. Jia, J. A. Kharraz, J. Guo, and A. K. An, *"Superhydrophobic (polyvinylidene fluoride-co-hexafluoropropylene) (polystyrene) composite membrane via a novel hybrid electrospin-electrospray process,"* J Memb Sci, vol. 611, p. 118360, October 2020; W. Jia, J. A. Kharraz, J. Sun, and A. K. An, *"Hierarchical Janus membrane via a sequential electrospray coating method with wetting and fouling resistance for membrane distillation,"* Desalination, vol. 520, p. 115313, December 2021, which is incorporated herein by reference in its entirety]. The resulting low wettability of this layer also contradicted the gecko-type adhesion behavior, further highlighting the significance of surface modifications introduced in M2.

Figure 7A:
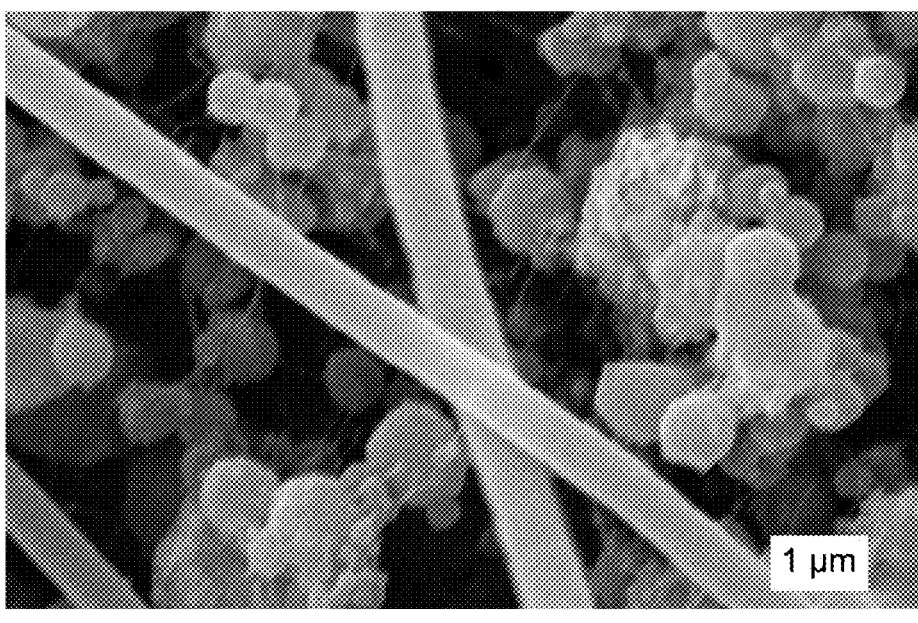
FIG. 7A shows a SEM image of a top surface of the M4 membrane where the PEI layer is peeled off with a scale bar of 1 μm, according to certain embodiments.
Figure 7B:
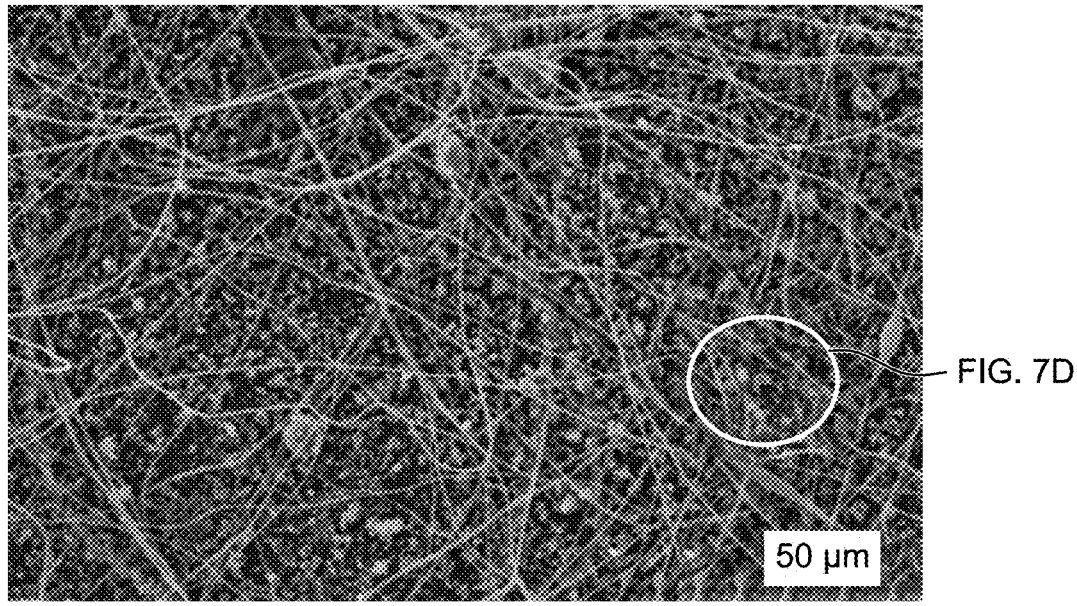
FIG. 7B shows the SEM image of the top surface of the M4 membrane where the PEI layer is peeled off with a scale bar of 50 μm, according to certain embodiments
Figure 7C:
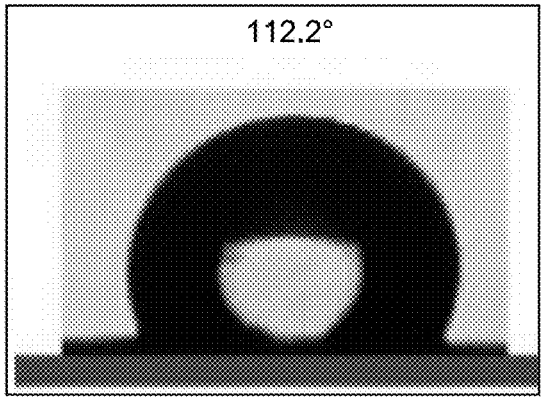
FIG. 7C shows an image of WCA measured the top surface of the M4 where the PEI layer is peeled off, showing a contact angle of 112.2°, according to certain embodiments.
Figure 7D:
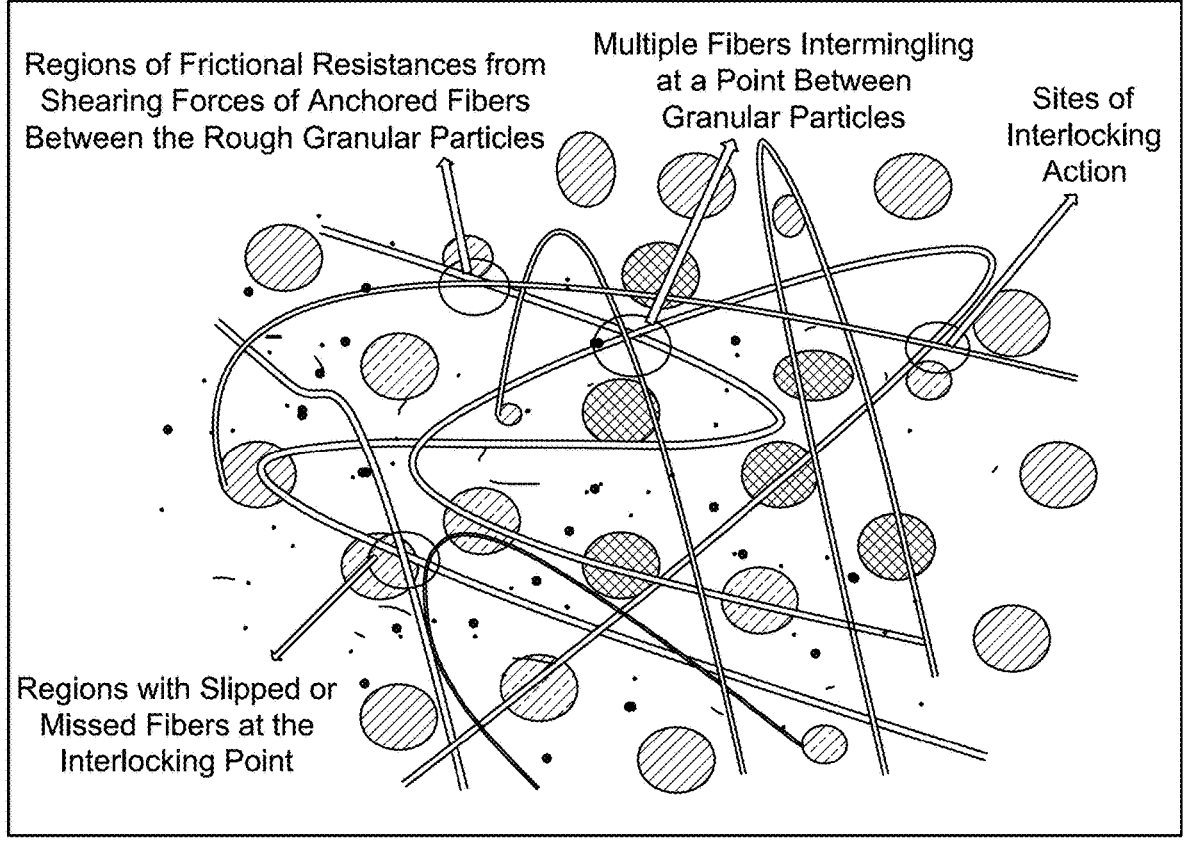
FIG. 7D shows a schematic diagram illustrating the interactions present in the multilayer Janus membrane, according to certain embodiments.
Figure 16A:
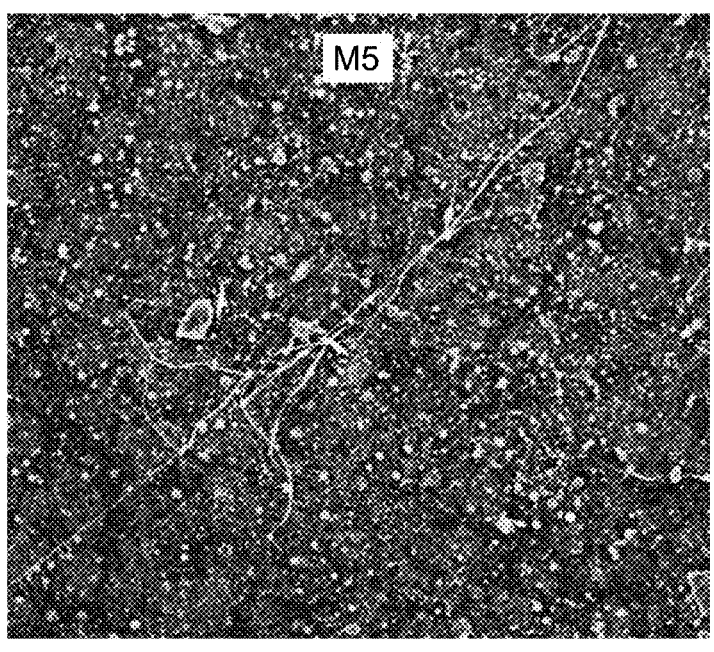
FIG. 16A shows a SEM image of a top surface of the M5 membrane where the PEI layer is peeled off, according to certain embodiments.
Figure 16B:
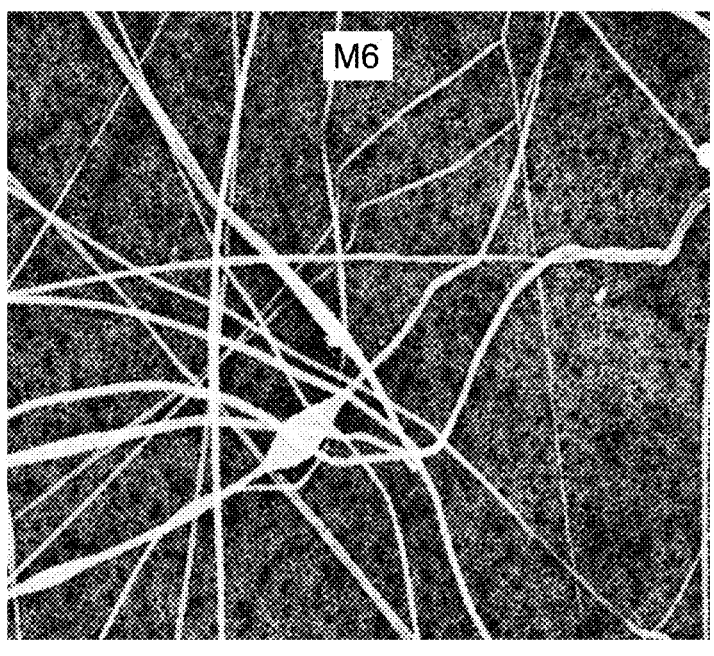
FIG. 16B shows a SEM image of a top surface of the M6 membrane where the PEI layer is peeled off, according to certain embodiments.

The adhesion strength of the M4 multilayer Janus membrane was evaluated using a peeling test. Physical force was applied to peel the PEI layer deposited on the rough M2 surface, and the peeled-up surface was analyzed via SEM to understand the proposed adhesion mechanism (FIGS. 7A-7D). The results revealed that the fibrous PEI network was intermingled with the rough, granular surface of the M2 membrane. Several factors contributed to the observed adhesion mechanism including the mechanical action, surface roughness enhancement and frictional forces (FIG. 7B). To begin with, multiple contact points could be observed from PEI nanofibers anchored and held fixed within the textured sprayed surface which can improve the mechanical strength of this physical interaction. Also, the granular structure of the electro-sprayed surface is highly fixed on the active substrate M1 and provides a high surface area that can enhance the penetration of the deposited fibers which conform to stronger physical adhesion. Another reinforcement worthy of explanation is the frictional force that enhances the resistance of fibers shearing, sliding or detaching from the interlocked points, a feature like the gecko-type adhesion. The FTIR analysis of peeled interface of the Janus membrane indicated plethora of peaks belonging to both PVDF-HFP in electrosprayed layer and PEI fibers from the support (FIG. 16A and FIG. 16B). Furthermore, the interaction of fibers and particles in the interfacial zone was also confirmed from the WCA shown in FIG. 7C which drops to $112.2°$ from $151.8°$ due to the anchored hydrophilic PEI fibers.

Figure 8A:
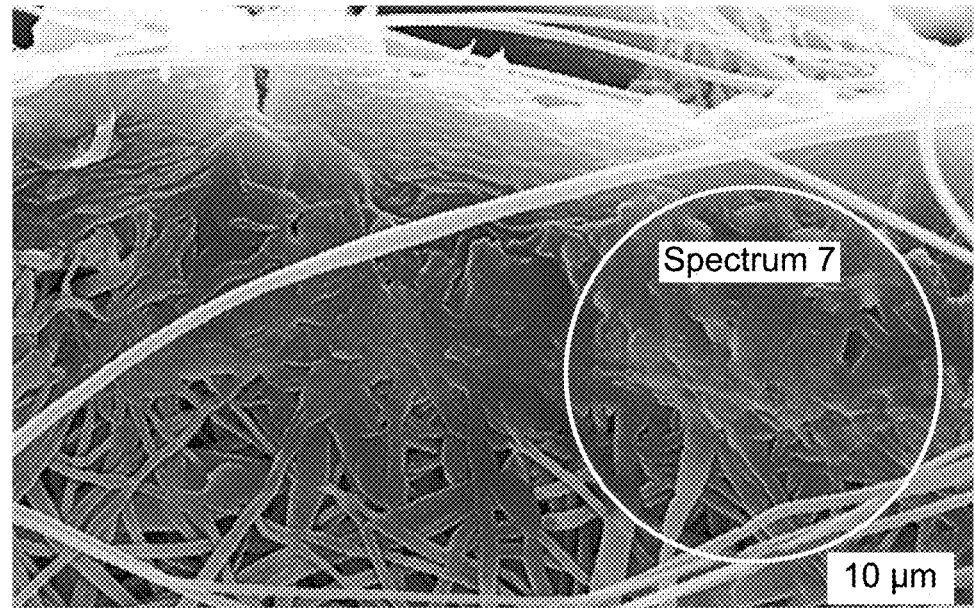
FIG. 8A shows an interface cross-sectional SEM image of the M4 membrane with a scale bar of 10 μm, according to certain embodiments.
Figure 8B:
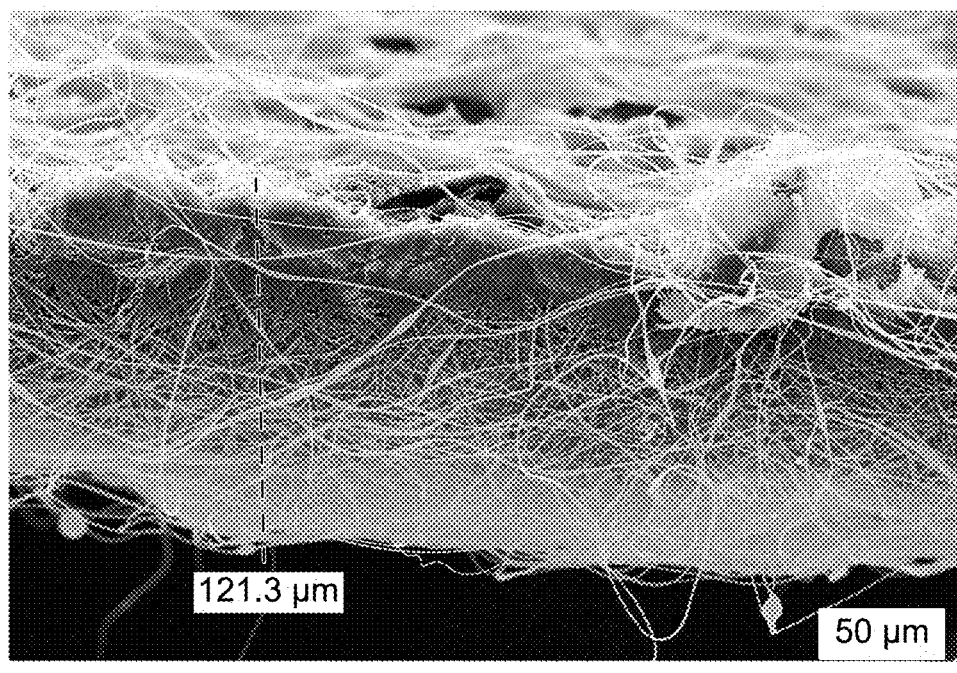
FIG. 8B shows an interface cross-sectional SEM image of the M4 membrane with a scale bar of 50 μm, according to certain embodiments.
Figure 8C:
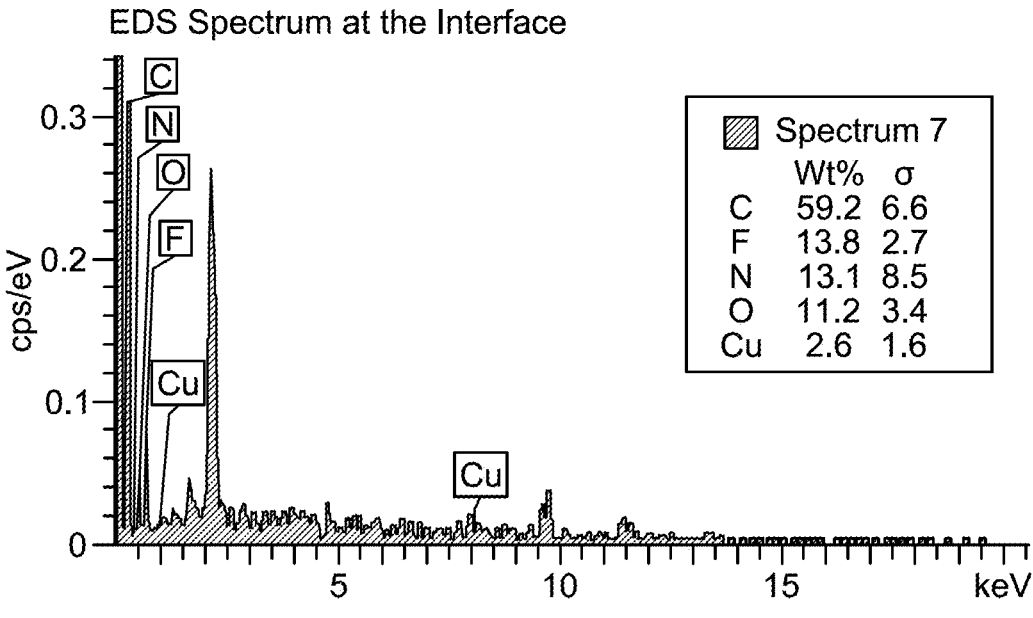
FIG. 8C shows an energy dispersive X-ray (EDS) spectrum obtained from a region around the interface of the M4 membrane, showing the elemental composition, according to certain embodiments.
Figure 8D:
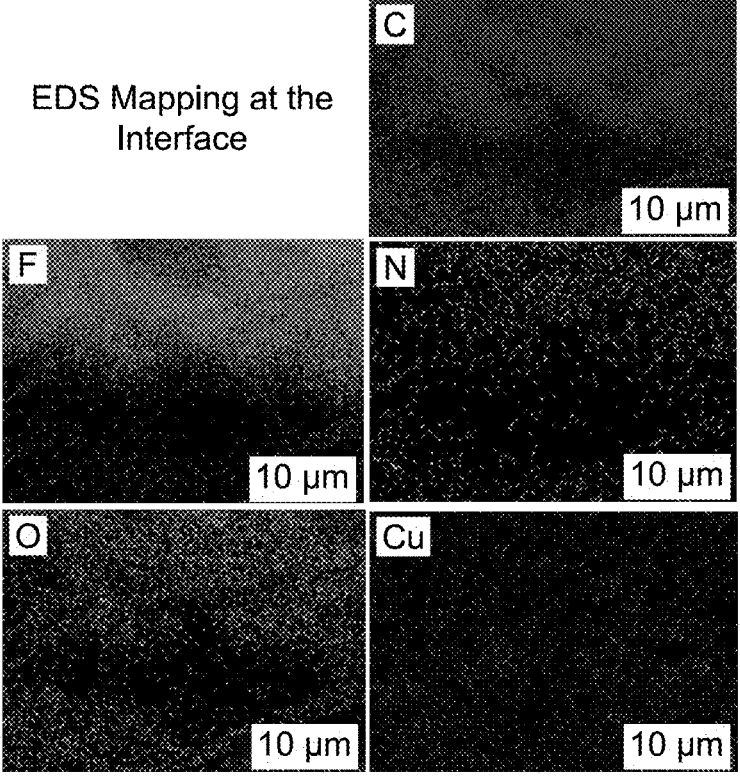
FIG. 8D shows EDS mapping images of the respective elements (C, F, N, O, and Cu) at the interface of the M4 membrane with a scale bar of 10 μm, showing the distribution of elements, according to certain embodiments.

The Janus multilayer membrane (M4) cross-sectional image is shown in FIGS. 8A-8B which shows distinct morphologies between the layers and interlocking structures. EDS elemental composition and mapping of the interface between hydrophobic and hydrophilic layer shown in FIGS. 8C-8D shows distribution of the main components of the PVDF (C, F) and PEI (C, N) polymer and presence of CuO particles at the interface. Furthermore, the EDS mapped images show a sharp change in the elemental distribution (especially F) which verifies the interfacial region in the Janus membrane.

Figure 9A:
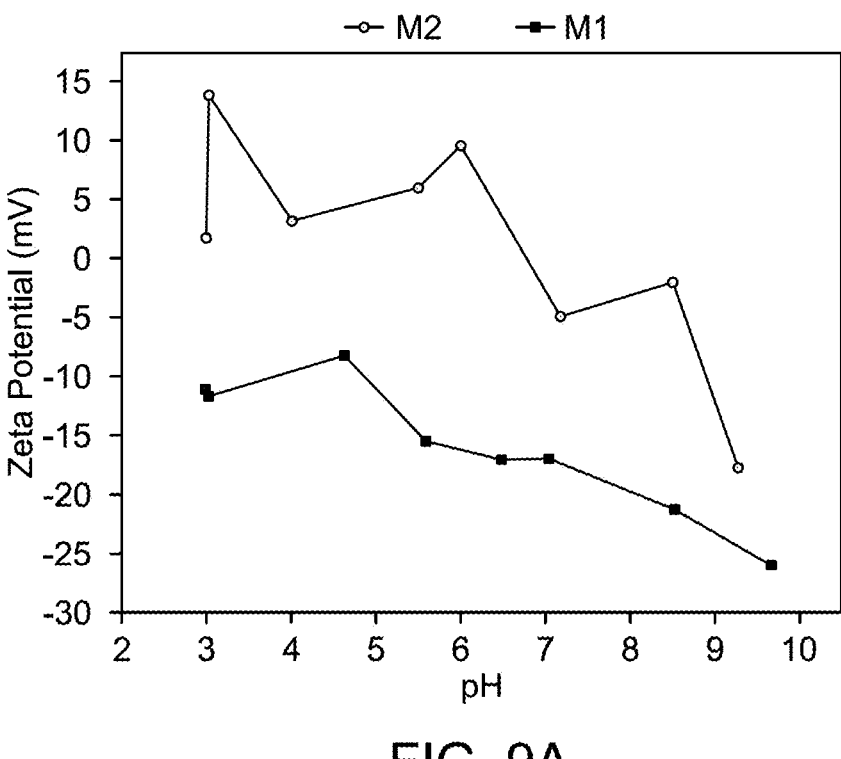
FIG. 9A shows a zeta potential analysis of the M1 and M2 membranes at a pH range of 2 to 10, according to certain embodiments.

The zeta potential data for the Janus membrane surfaces near the interfacial layer at different pH values is displayed in FIG. 9A. It was found that under both basic and acidic conditions, the M1 membrane skin surface maintains a negative zeta potential value. At neutral conditions, the zeta potential value was nearly-17 mV, indicating a stronger negative potential. Over a broad pH range, the electrosprayed PVDF-HFP+CuO membrane (M2) retains positive zeta potential, though it does change only at higher pH levels to neutral or slightly negative values [See: S. Metwally and U. Stachewicz, "*Surface potential and charges impact on cell responses on biomaterials interfaces for medical applications,*" Materials Science and Engineering: C, vol. 104, p. 109883, November 2019, which is incorporated herein by reference in its entirety]. The interaction of CuO nanoparticles with the PVDF-HFP matrix is likely the cause of this phenomenon, which points to a surface rich in polarizable functional groups. On the other hand, CuO is a polar substance that can contribute to surface polarization due to its localized surface charges [See: E. A. Mohamed, "*Green synthesis of copper & copper oxide nanoparticles using the extract of seedless dates,*" Heliyon, vol. 6, no. 1, p. e03123, January 2020, which is incorporated herein by reference in its entirety]. In contrast, dipole formations were shown to be supported by PVDF-HFP, which forms the rough matrix, when it encountered charged species. Therefore, this polarizability can help make rough surfaces more dynamically sensitive to interactions.

In line with the research results, polyetherimide, which was described as having a significantly negative potential, will interact more favorably with M2 surface than with M1 [See: F. Gholami, A. Asadi, M. Dolatshah, and S. Nazari, "*Modeling and optimization of surface modification process of ultrafiltration membranes by guanidine-based deep eutectic solvent,*" Heliyon, vol. 11, no. 1, p. e41432, January 2025, which is incorporated herein by reference in its entirety]. Strong adhesion is promoted by an electrostatic interaction between the negatively charged PEI fibers and the positive zeta potential of M2 at lower pH values. Van der Waals forces and polar contacts can still promote advantageous interfacial interactions at higher pH levels, when M2 is closer to a neutral zeta potential. M1, on the other hand, would mostly encounter repulsive electrostatic forces due to its continuously negative zeta potential over the pH range, which would limit its ability to interact with PEI.

Figure 9B:
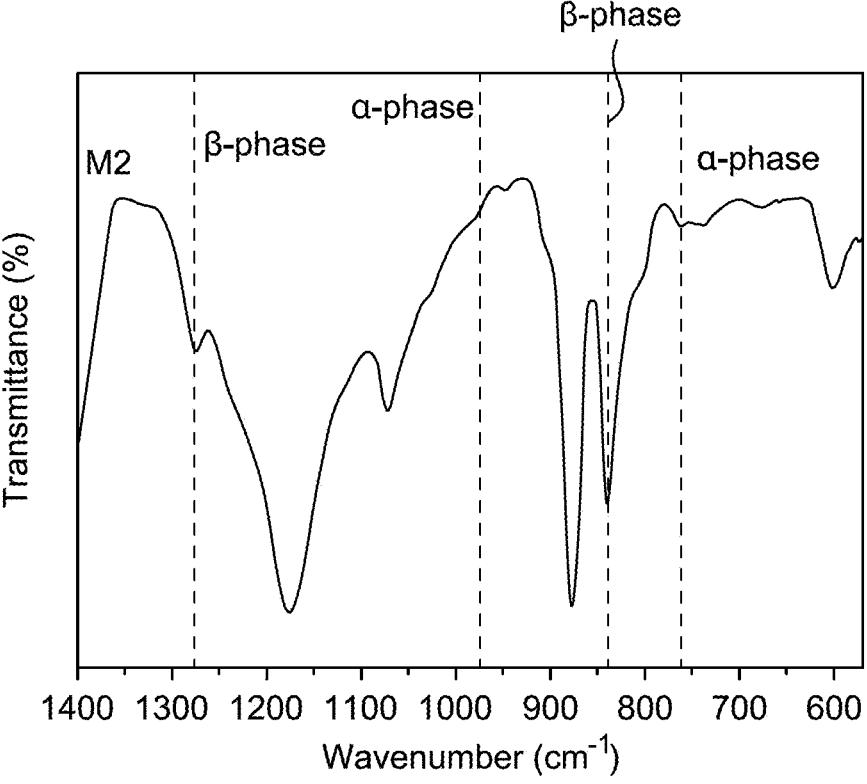
FIG. 9B shows a FT-IR spectrum of the M2 membrane, according to certain embodiments.
Figure 9C:
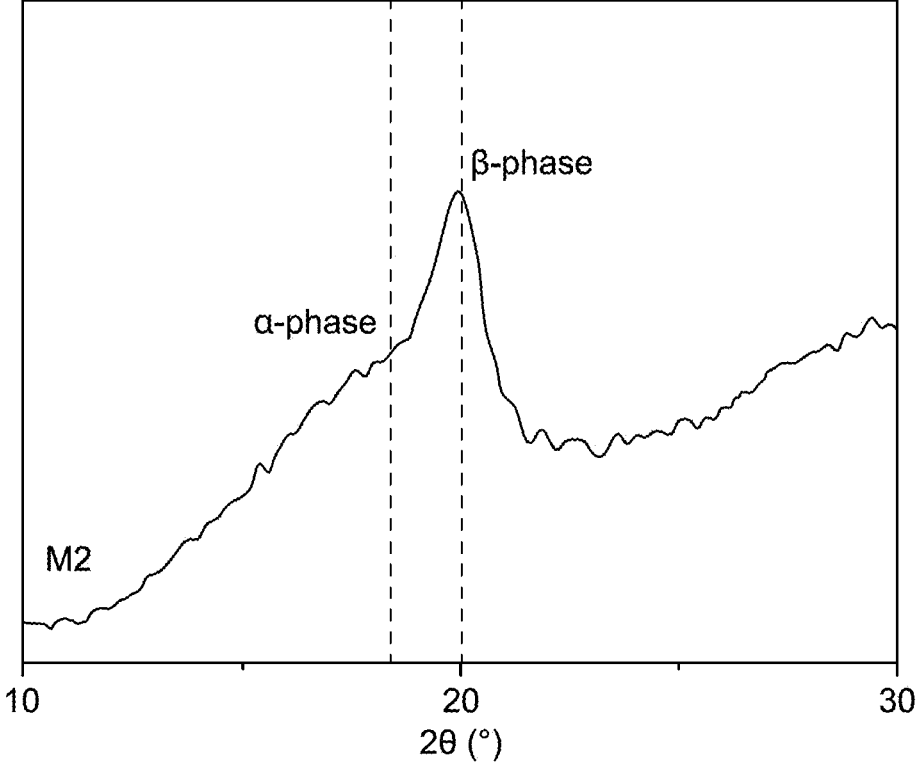
FIG. 9C shows an X-ray diffraction (XRD) spectrum of the M2 membrane, according to certain embodiments.

Moreover, the polarizability of the interfacial layer could be explained relative to the PVDF phases present at the interface. Out of many phases for PVDF-HFP, the β-phase appeared to be highly electro-active which is attributed to the alignment of dipoles in its configuration [See: Y. Liu et al., "*Phase separation of a PVDF-HFP film on an ice substrate to achieve self-polarisation alignment,*" Nano Energy, vol. 106, p. 108082, February 2023, doi: 10.1016/j.nanoen. 2022, which is incorporated herein by reference in its entirety]. This configuration referred as TTTT state has the maximum dipole moment and hence could increase the interactions between dipoles [See: S. Shi et al., "*Three-dimensional polypyrrole induced high-performance flexible piezoelectric nanogenerators for mechanical energy harvesting,*" Compos Sci Technol, vol. 219, p. 109260, March 2022, which is incorporated herein by reference in its entirety]. As can be seen in FIG. 9B, the FT-IR spectra of the M2 membrane surface shows distinctive peaks at 1400 $cm^{-1}$, 1276 $cm^{-1}$ and 840 $cm^{-1}$ which corresponds to the β-phase and other peaks at 762 $cm^{-1}$ and 975 $cm^{-1}$ corresponds to the α-phase. Noticeably, the peaks of the β-phase were found to be highly intense while the α-peaks are hardly seen. To confirm the availability of the β-phase and the disappearance of α-phase in M2 membrane surface, XRD analysis was conducted, and the result was displayed in FIG. 9C. As can be observed, the peak at $20.02°$ was broad and clear and corresponds to the β-phase crystal planes while that just above $18°$ corresponds to the α-phase crystal planes [See: Y. Liu et al., "*Phase separation of a PVDF-HFP film on an ice substrate to achieve self-polarisation alignment,*" Nano Energy, vol. 106, p. 108082, February 2023, which is incorporated herein by reference in its entirety]. These findings indicate that the proposed interface in this work is highly polarized and electroactive which opens up to various physical dipolar interactions. Hence the CuO and PVDF-HFP layer deposited through electro-spraying process provided a polarizable and superhydrophobic surface. The ionic character of CuO and PVDF-HFP's dipolar nature are the causes of the polarizability, respectively [See: U. Gradišar Centa, M. Mihelčlč, V. Bobnar, M. Remškar, and L. Slemenik Perše, "*The Effect of PVP on Thermal, Mechanical, and Dielectric Properties in PVDF-HFP PVP Thin Film,*" Coatings, vol. 12, no. 9, p. 1241 August 2022; B. M. Alotaibi, R. Altuijri, A. Atta, E. Abdeltwab, and M. M. Abdelhamied, "*Fabrication, structure and optical characteristics of CuO polymer nanocomposites materials for

*optical devices," International Journal of Polymer Analysis and Characterization*, vol. 29, no. 7, pp. 562-572, October 2024, which is incorporated herein by reference in its entirety].

One of the crucial factors in determining membrane performance in MD is liquid entry pressure, which also assesses how long a membrane will last in terms of pore wetting resistance. From Table. 2 the LEP of M1, which was only surface roughened (single layer), showed a value of 1.6 bar based on the instrumentation used to determine the LEP values of the fabricated membranes. The concentration of the host active polymer and the higher WCA produced, as explained in the preceding paragraphs, resulted in the higher LEP. As a result, the deposition of interfacial layer in M2 and M3 membranes resulted in slight increase in LEP to 1.7 bar. This can be attributed to the electro-sprayed particles which could obstruct a portion of the membrane's surface porosity. Furthermore, it was observed that the LEP values further increased with the co-deposition of the electro-spun PEI fibers in multi-layer membranes due to the decrease in pore size and increase in membrane thickness consequently increasing the density of the membranes and LEP (Table. 2). The modest rise indicates that membrane linked pores are not significantly affected by the hydrophilic PEI layer.

TABLE 2

Intrinsic properties of the Janus membrane

| Membranes | Thickness (μm) | LEP (bar) | Mean pore size (μm) |
|---|---|---|---|
| M1 | 54.2 ± 5.5 | 1.6 ± 0.1 | 0.581 ± 0.15 |
| M2 | 65.2 ± 4.3 | 1.7 ± 0.05 | 0.551 ± 0.20 |
| M3 | 67.0 ± 5.3 | 1.7 ± 0.12 | 0.530 ± 0.33 |
| M4 | 121.3 ± 8.2 | 1.9 ± 0.2 | 0.477 ± 0.29 |
| M5 | 137.2 ± 7.1 | 1.9 ± 0.2 | 0.472 ± 0.35 |
| M6 | 117.4 ± 2.4 | 1.8 ± 0.0 | 0.498 ± 12 |

Figure 10A:
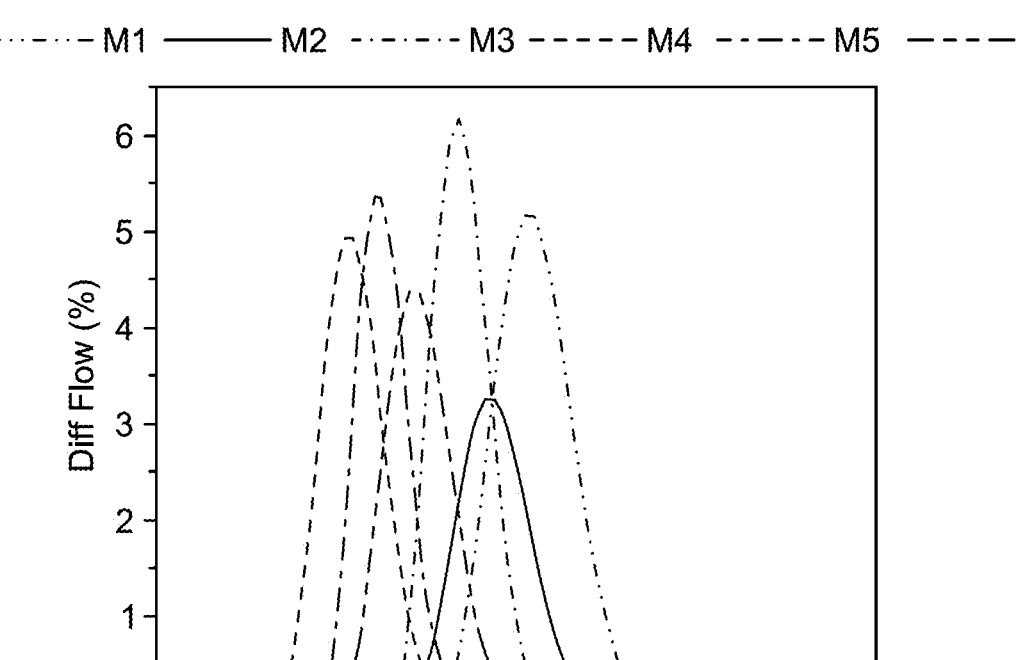
FIG. 10A shows a pore size distribution analysis of the M1 to M6 membranes, according to certain embodiments.

The pore size distribution data for all developed membranes is illustrated in FIG. 10A which depicts narrow PSD in all membranes and relatively large pore sizes in the initial membrane layer M1 attributed to the effects of casting substrate, NIPS process and membrane thickness [See: T. N. Baroud, *"Tuning PVDF Membrane Porosity and Wettability Resistance via Varying Substrate Morphology for the Desalination of Highly Saline Water," Membranes (Basel)*, vol. 13, no. 4, p. 395, March 2023; M. A. Azeem, D. U. Lawal, H. Al Abdulgader, and T. N. Baroud, *"Enhanced performance of superhydrophobic polyvinylidene fluoride membrane with sandpaper texture for highly saline water desalination in air-gap membrane distillation," Desalination*, vol. 528, p. 115603, April 2022; R. Shekari, A. Dehban, and A. Kargari, *"Fabrication of PVDF membranes via VIPS-NIPS technique for water desalination: Effect of preparation condition," Desalination Water Treat*, vol. 319, p. 100447, July 2024, which is incorporated herein by reference in its entirety]. However, as can be seen in table 2, the net membrane thickness affects the mean pore sizes of the membranes which was a consequence of layers addition. M4 and M5 have multiple layers showing higher thickness and as well LEP and hence lower pore sizes compared other membranes respectively. M1 membrane which was a single layer membrane, showed lower thickness and as such higher pore sizes.

The stress-strain relationship of fabricated membranes with different layers (M1, M4, and M6) was examined to develop a better understanding of the interfacial influence on the mechanical stability of the developed Janus membrane.

Figure 10B:
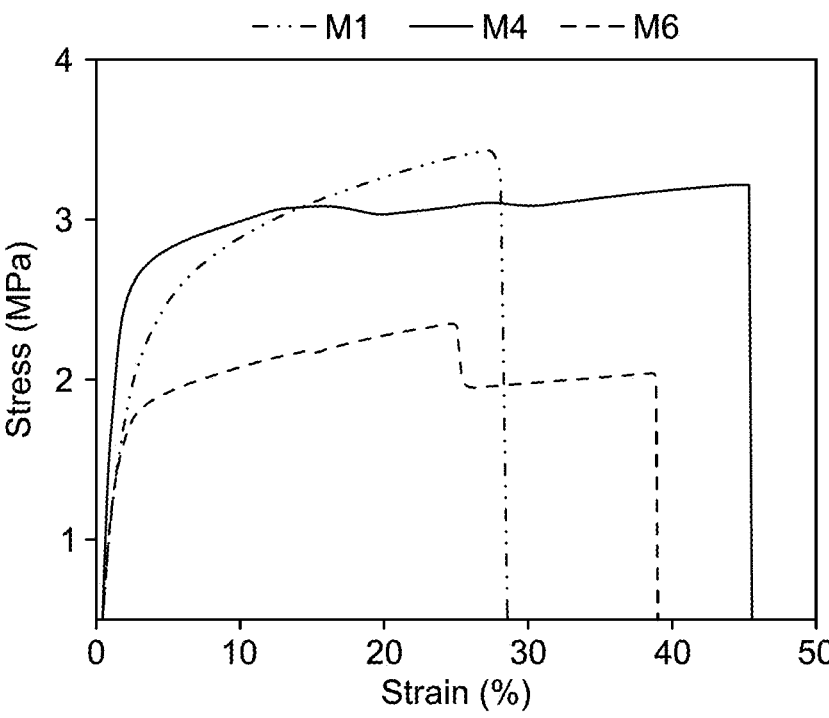
FIG. 10B shows a mechanical analysis (MA) of the M1, M4, and M6 membranes, according to certain embodiments.

The single layer M1 membrane achieved a maximum stress of approx. 3.4 MPa and an elongation strain of approximately 28%, as shown in FIG. 10B. PVDF flat sheet membranes through NIPS process leads to a consistent composition and structure with effective stress distribution, responsible for the observed uniform deformation and smoothness in the curve [See: M. A. Azeem, D. U. Lawal, H. Al Abdulgader, and T. N. Baroud, *"Enhanced performance of superhydrophobic polyvinylidene fluoride membrane with sandpaper texture for highly saline water desalination in air-gap membrane distillation," Desalination*, vol. 528, p. 115603, April 2022; H. Ji et al., *"Janus membrane prepared via one step depositing coatings onto PVDF PDMS membrane for simultaneous antiwetting and antifouling in DCMD," Desalination*, vol. 539, p. 115964, October 2022, which is incorporated herein by reference in its entirety]. The mechanical behavior of M4, a multiple-layer membrane with an interlocking interface, was distinct. Over a strain range of around 15-25%, the stress-strain curve showed a plateau region at approx. 3.1 MPa. After this point, M4 showed a progressive rise in strain, peaking at about 45% before failing. The interlocking interface appears to be essential for improving adhesion and promoting stress transmission between layers, allowing the membrane to withstand greater elongation. Nevertheless, the stress plateau indicates the existence of shear and interfacial friction forces resistance, which would have counterbalanced the advantages of improved adhesion by adding resistance to deformation. Because of these characteristics, the triple layer membrane M4 has demonstrated superior mechanical stability. Conversely, M6 dual layer membrane without interfacial layer showed the least effective mechanical performance revealing a sudden stress reduction, indicating premature failure, after reaching a maximum stress of about 2.3 MPa at a strain of about 23%. Under tensile stress, delamination resulted from ineffective load transfer between layers caused by a lack of interfacial connection. This finding emphasizes the importance of interfacial adhesion between a flat sheet and fiber support to preserve the structural integrity and enhance the mechanical characteristics of multilayer membranes.

Figure 11A:
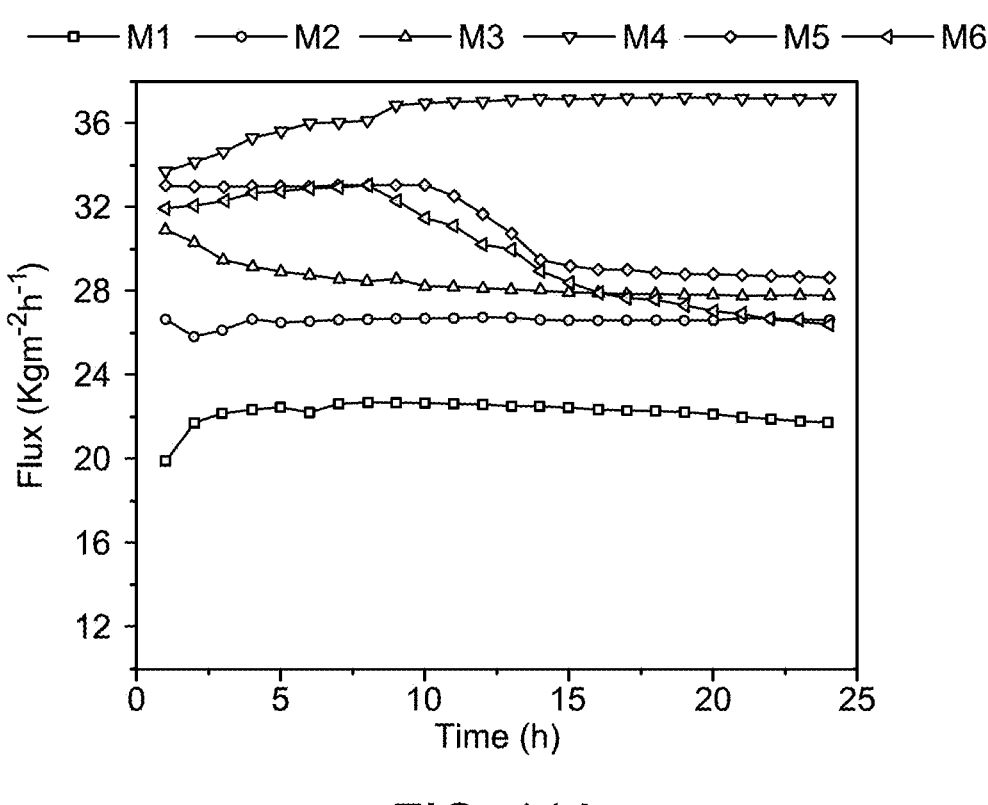
FIG. 11A shows a water-gap membrane distillation (WGMD) performance of the M1 to M6 membranes, showing a relationship of permeate flux versus time, according to certain embodiments.
Figure 11B:
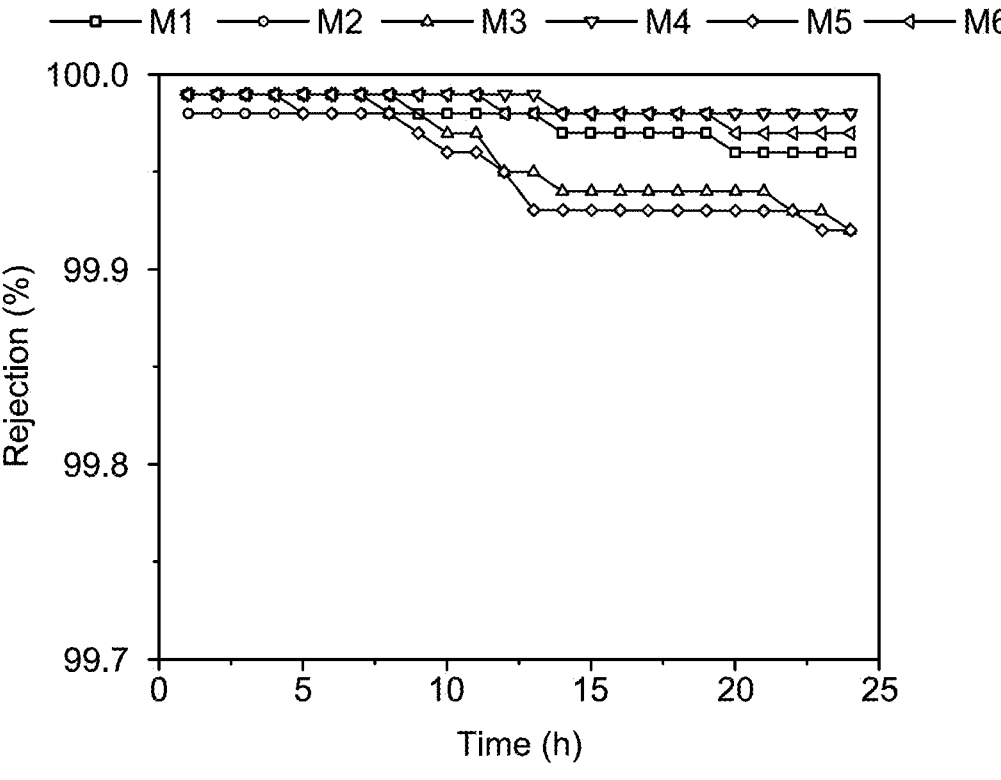
FIG. 11B shows a water-gap membrane distillation (WGMD) performance of the M1 to M6 membranes, showing a relationship of salt rejection versus time, according to certain embodiments.

Membranes developed were evaluated in water gap membrane distillation (WGMD) to increase permeate flux during WGMD treatment of high-salinity water (up to 70,000 ppm), the main objectives were to improve water uptake and retain adhesion between the hydrophobic and hydrophilic layers during MD test. The membrane's performance was assessed using MD experiments, such as treating high-salinity feed for 24 hours, long term test operating for 60 hours, and evaluating antifouling and anti-wetting properties. Following MD tests, other characterization methods were used to examine surface characteristics, including WCA measurements, SEM imaging, and EDS mapping. Firstly, the WGMD results with flux and salt rejection for all developed membranes are displayed in FIGS. 11A-11B. After 24 hours of testing, the single layer M1 membrane showed a permeate flux of 21.70 kg $m^{-2}$ $h^{-1}$ and salt rejection of 99.97%. Because of the concomitant increase in the interfacial surface area of the membrane facing the feed side, surface roughness can improve membrane performance in MD [See: Z. Kuang, R. Long, Z. Liu, and W. Liu, *"Analysis of temperature and concentration polarizations for performance improvement in direct contact membrane distillation," Int J Heat Mass Transf*, vol. 145, p. 118724, December 2019, which is incorporated herein by reference in its entirety]. It may be easier to induce roughness using a textured surface like sandpaper in the NIPS process than it is to use surface chemical modification, which raises the net cost of membrane fabrication and results in a less sustainable and environmentally friendly product [See: T. N. Baroud, "*Tuning PVDF Membrane Porosity and Wettability Resistance via Varying Substrate Morphology for the Desalination of Highly Saline Water,*" *Membranes* (*Basel*), vol. 13, no. 4, p. 395, March 2023, which is incorporated herein by reference in its entirety]. On the other hand, dual layer membranes involving CuO nanoparticles with hydrophobic (M2) and hydrophilic (M3) polymer additive demonstrated a flux of 26.61 kg m$^{-2}$ h$^{-1}$ with 99.99% and 27.3 kg m$^{-2}$ h$^{-1}$ with 99.92% salt rejection under the same test conditions respectively. Due to its higher thermal conductivity the presence of CuO on the permeate side of the membrane was responsible for the abatement of temperature polarization and consequently increase in flux relative to the single layer membrane (M1). CuO nanoparticles also improved selectivity through hierarchical architectures, improved adhesion and membrane stability under ideal spraying circumstances and composite ratios used in this work. Nanoparticles can enhance the fabrication of multilayer Janus membranes for MD applications by encouraging faster water absorption and reduced mass transfer resistance [See: M. U. Farid et al., "*Advancements in Nanoenabled Membrane Distillation for a Sustainable Water-Energy-Environment Nexus,*" *Advanced Materials*, vol. 36, no. 17, April 2024, which is incorporated herein by reference in its entirety]. The use of ferrous oxide nanoparticles as adhesion materials was demonstrated, which enhanced performance through improved interfacial bonding [See: W. Zhang, S. Yu, P. Li, X. Ji, R. Ning, and P. Li, "*Preparation Janus membrane via polytetrafluoroethylene membrane modification for enhanced performance of vacuum membrane distillation desalination,*" *Sep Purif Technol*, vol. 313, p. 123465, May 2023, which is incorporated herein by reference in its entirety]. The excellent interactions of CuO particles with nanofibers matrix can be explained to result in excellent mechanical property [See: M. N. Sarwar et al., "*Electrospun PVA CuONPs Bitter Gourd Nanofibers with Improved Cytocompatibility and Antibacterial Properties: Application as Antibacterial Wound Dressing,*" *Polymers* (*Basel*), vol. 14, no. 7, p. 1361 March 2022, which is incorporated herein by reference in its entirety].

Furthermore, the permeate flux of triple layer membranes M4 and M5 increased to 37.2 kg m$^{-2}$ h$^{-1}$ and 28.62 kg m$^{-2}$ h$^{-1}$ respectively, compared to their predecessors (M2 and M3). This improvement is attributed to the hydrophilic layer's (PEI fibers) ability to draw vapor closer to the permeate side for condensation, despite the increase in membrane thickness as shown in table 2. However, the performance difference between M4 and M5 was linked to the interaction between the hydrophilic fibers and the composite adhesion layer. While both membranes had identical PEI thicknesses, M5 exhibited a gradual decline in flux after 10 hours due to early delamination of the PEI fibers. This delamination likely arose from weak physical interactions and interfacial stress caused by water retention in the membrane. In contrast, M4 maintained steady flux and strong salt rejection, demonstrating superior MD performance. On the other hand, the M6 Janus membrane without interfacial layer exhibited significantly lower performance showing gradual decrease in flux, underscoring the importance of the interfacial composite layer in enhancing adhesion and vapor flux. Hence material selection played a critical role, as layer adhesion and effective heat transfer across the membrane surface diffused thermal gradients, ensuring uniform temperature distribution and enhancement in membrane performance in MD. The performance of M4 was benchmarked against previously reported Janus membranes in table 3, confirming its suitability for treating highly saline water with optimal water permeation and rejection.

Figure 12A:
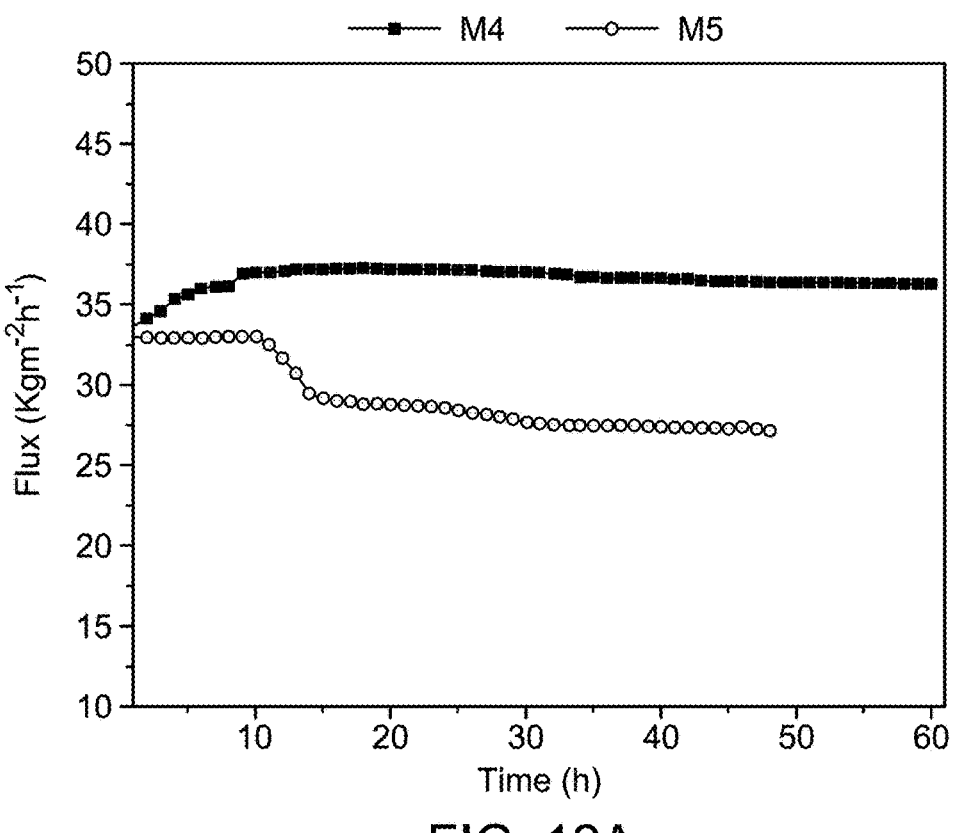
FIG. 12A shows a comparison in the long-term WGMD performance of the M4 and M5 membranes, showing a relationship of permeate flux versus time, according to certain embodiments.
Figure 12B:
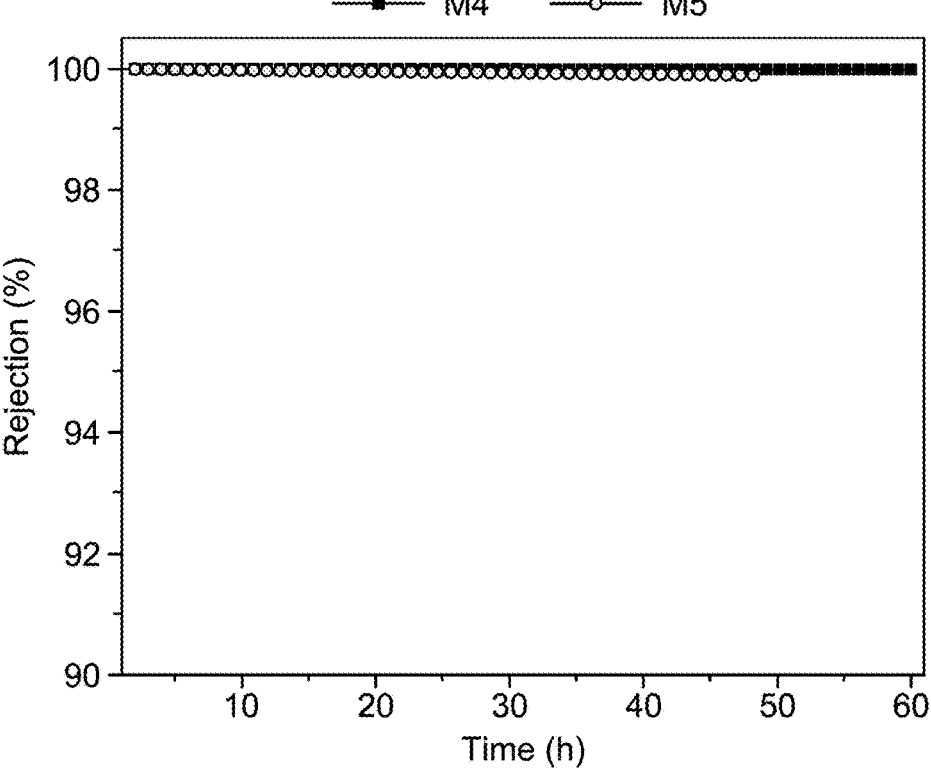
FIG. 12B shows a comparison in the long-term WGMD performance of the M4 and M5 membranes, showing a relationship of salt rejection versus time, according to certain embodiments.

The fabricated Janus membranes with interfacial layer (M4 and M5) were assessed under prolonged WGMD test. After 48 hours of operation, the M5 membrane showed a flux of 27.15 kg m$^{-2}$ h$^{-1}$ and 99.90% salt rejection (FIGS. 12A-12B). A sharp decline in flux was noted in M5 membrane after 10 hours indicating delamination of hydrophilic layer due to poor adhesion provided by the interfacial layer composite involving PAN and CuO. However, over 60 hours of WGMD testing, the M4 Janus membrane maintained a flux of 36.23 kg m$^{-2}$ h$^{-1}$ and a salt rejection of 99.97%, indicating long-term stability. Since the interfacial/composite layer in Janus membrane (M4) is superhydrophobic with hierarchical granular structures as explained earlier, the long-term stability of the membrane is due to the hydrophobic layer of Janus membrane induced with self-cleaning effect from the synergistic impact of CuO particles as well as the strength of the electric field in the electrospraying process binding the particles in the matrix of the PVDF membrane. Consequently, the higher LEP and nominal pore size of the membrane (M4) provided stable rejection performance in MD. The observed drop in flux for M4 membrane during prolonged operation was minimal and could be attributed to the combined effects of membrane surface wetting and the aggressive chloride ions (Cl$^{-}$) present in the high-salinity feed. These factors likely induced minor surface modifications that marginally impacted flux over time. Notably, the M4 membrane exhibited no delaminated layers after long-term testing, with the layer attachment and thickness remaining nearly identical to their initial states before testing. This result highlights the superior adhesion and structural integrity provided by the interfacial layer of PVDF-HFP and CuO in M4 membrane, which enabled it to outperform M5 in maintaining stable flux and salt rejection over an extended operational period.

Figure 12C:
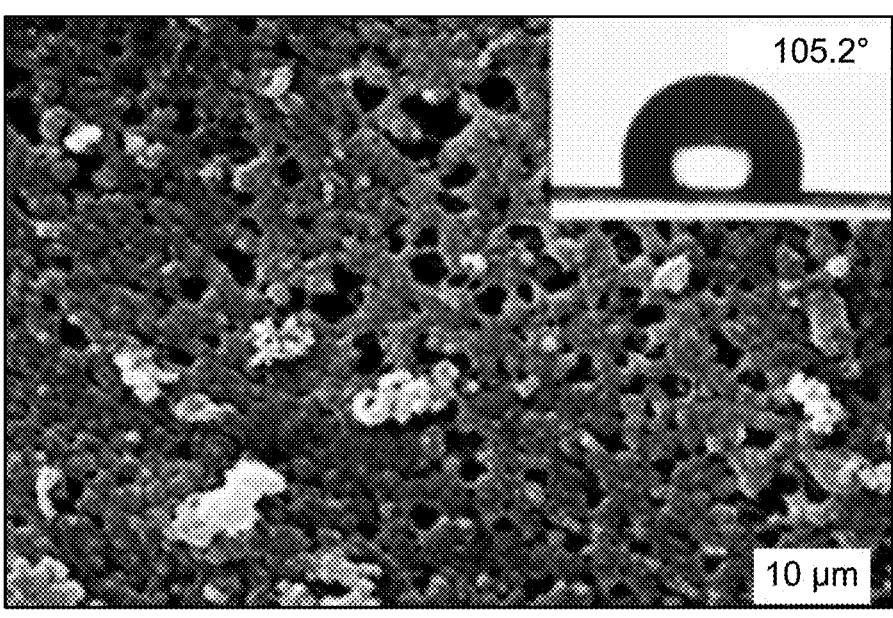
FIG. 12C shows an SEM image and an image of WCA (inset on the upper right corner) of the hydrophobic active layer in the M4 membrane after 60 hours of membrane distillation (MD) embodiments.
Figure 12D:
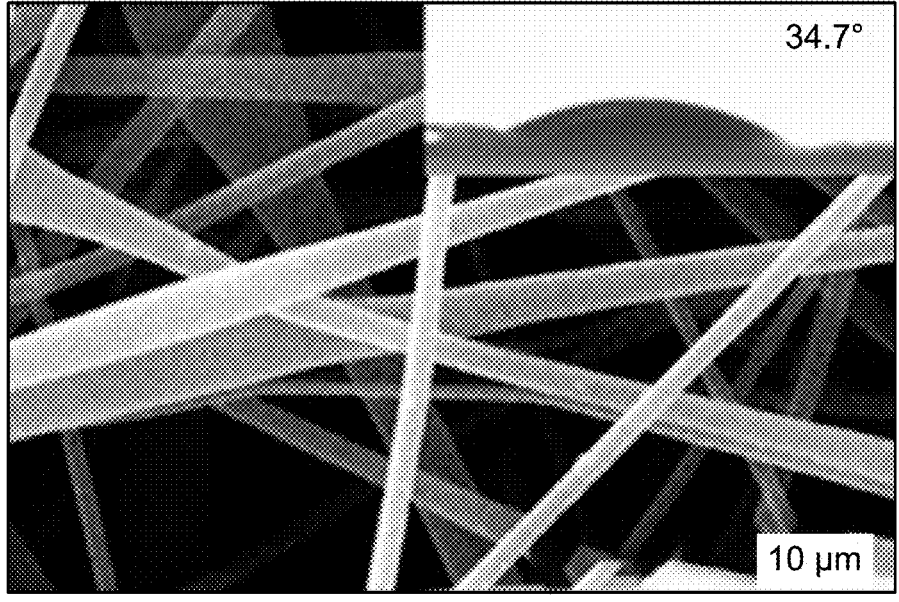
FIG. 12D shows an SEM image and an image of WCA (inset on the upper right corner) of the PEI layer in the M4 membrane after 60 hours of MD testing, according to certain embodiments.
Figure 12E:
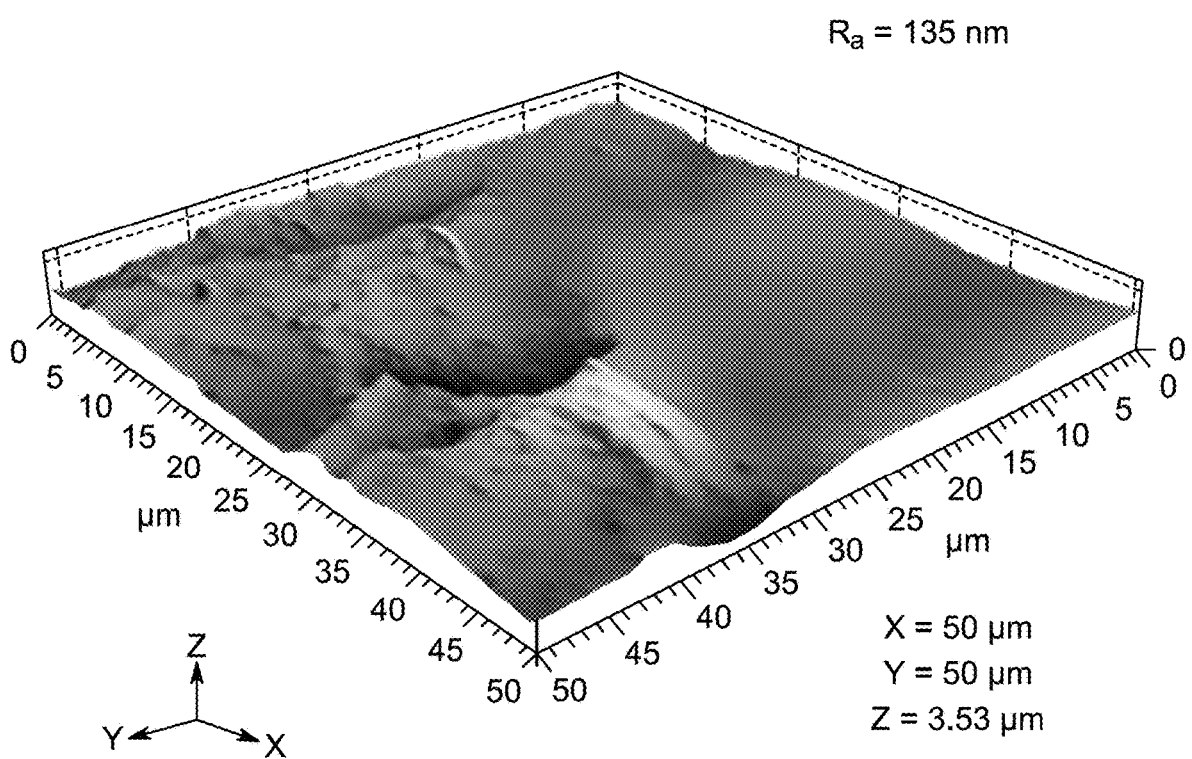
FIG. 12E shows an AFM image of the hydrophobic active layer of the M4 membrane after long-term MD testing, according to certain embodiments.
Figure 13A:
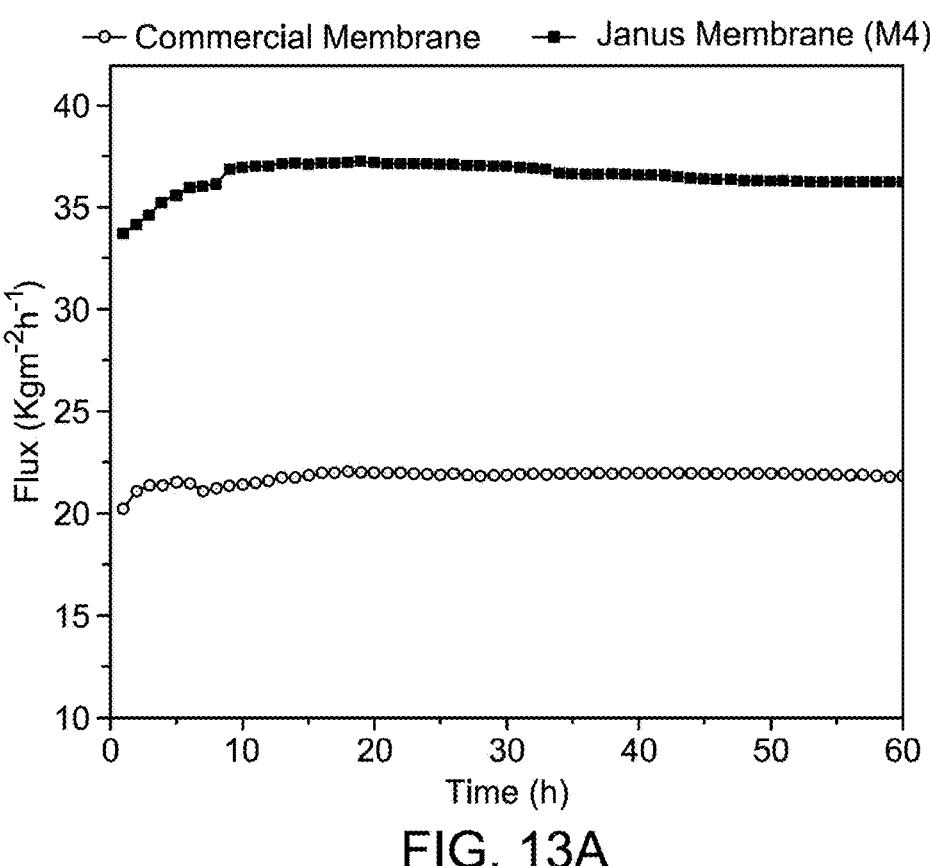
FIG. 13A shows a comparison in the long term WGMD performance in terms of permeate flux between the M4 membrane and a commercial PVDF membrane, according to certain embodiments.
Figure 13B:
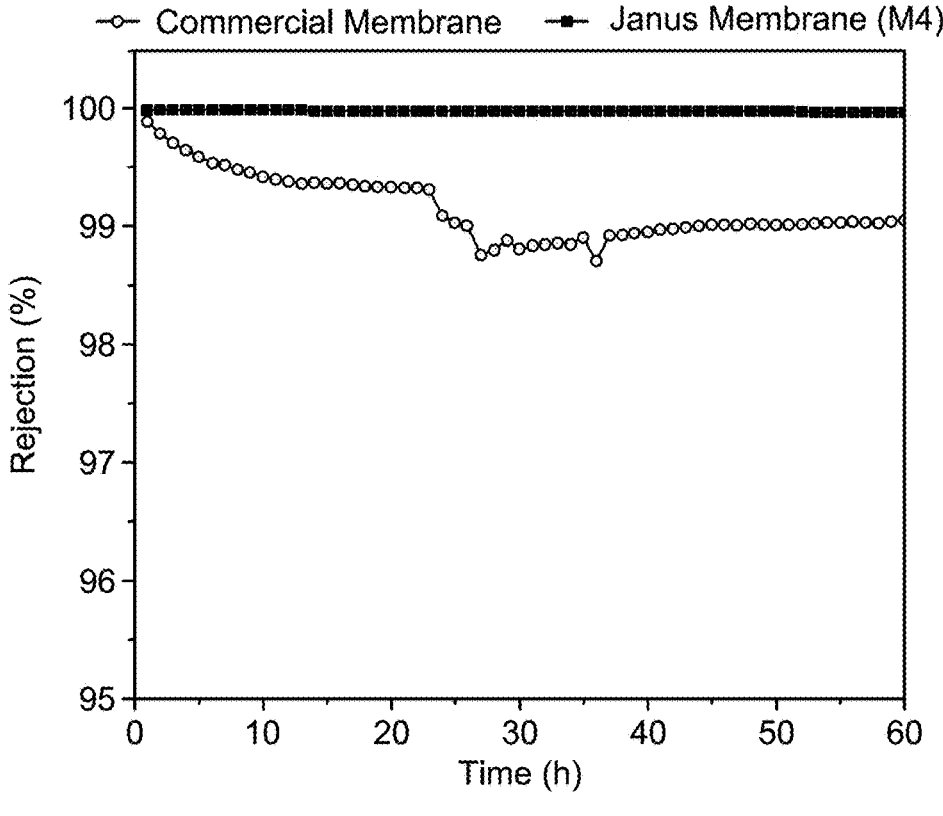
FIG. 13B shows a comparison in the long term WGMD performance in terms of salt rejection between the M4 membrane and the commercial PVDF membrane, according to certain embodiments.

It is worth mentioning that the hydrophobic active layer in M4 Janus membrane was stable after 60 hours with minimal change in the surface porosity and WCA (105.2°) as seen in FIG. 12C. The membrane stability is also established from the surface roughness of the active hydrophobic layer after long term test, observed from the AFM image (FIG. 12E), where the R$_a$ value of the active surface was measured as 135 nm. In a similar scenario, surface analysis was performed on the hydrophilic PEI layer; the interconnected fibers remained stable, and the morphology remained like that observed prior to the WGMD (FIG. 12D). A comparison is given in Table 3, highlighting the stability of the Janus membrane M4 in hypersaline treatment. In a similar vein, M4 membrane performance in desalination was compared with commercial PVDF membrane. Even though M4 membrane has comparable pore size to the commercial membrane used for comparison (0.44 μm), the outstanding performance displayed by M4 was confirmed in terms of both flux and salt rejection (FIGS. 13A-13B).

TABLE 3

| Literature comparisons between previously reported Janus membranes | | | | | | | |
|---|---|---|---|---|---|---|---|
| Hydrophobic/ Janus membrane | Fabrication techniques | Flux (kg m$^{-2}$ h$^{-1}$) | Saline Rejection (%) | Feed conc. (ppm) | Testing duration | Membrane Distillation type | Reference |
| PVDF-Psf | Electrospinning/ Electrospinning | 53.6 | 99.99 | 30,000 | — | DCMD | [1] |
| PVDF-SiO$_2$ | Electrospinning/ Electrospinning | 24.6 | 99.99 | 35,000 | 40 | DCMD | [2] |
| PH | Electrospinning | 22 | 99.99 | 10,000 | 24 | DCMD | [3] |
| PH-PVA/PAN | Electrospinning/ Electrospinning | 15.5 | 99.99 | 35,000 | 20 | AGMD | [4] |
| PVDF/HSiO$_2$-PDA-APTES-TEOS | NIPS/PDA coating | 52.6 48.6 | 99.99 | 35,000 | 24 70 | DCMD | [5] |
| PPSU/SiNP | NIPS | 42.64 | 94.9 | 35,000 | 5 | DCMD | [6] |
| PVDF-SiO$_2$ | NIPS/Spray-coating | 7.4 | 99.99 | 35,000 | 10 | AGMD | [7] |
| PVDF-PVA/PAA | Electrospinning/ Electro-spraying | 27 | 100 | 35,000 | 36 | DCMD | [8] |
| PVDF/PDMS-PEI/GA | NIPS/co-deposition | 15.7 | 99.99 | 35000 | 36 | DCMD | [9] |
| PVDF/PP/SMMs-PEI/DA/SMMs | Electrospinning/ NIPS/ Electrospinning | 50-70 | 99.99 | — | 95 | DCMD | [10] |
| PVDF-CuO-PEI | NIPS/Electro-spraying/Electro-spinning | 36.23 | 99.97 | 70,000 | 60 | WGMD | Present disclosure |

[1] M. Khayet, M. C. Garcia-Payo, L. Garcia-Fernandez, and J. Contreras-Martinez, "Dual-layered electrospun nanofibrous membranes for membrane distillation," Desalination, vol. 426, pp. 174 184, January 2018, which is incorporated herein by reference in its entirety.

[2] Y. Liao, C.-H. Loh, R. Wang, and A. G. Fane, "Electrospun Superhydrophobic Membranes with Unique Structures for Membrane Distillation," ACS Appl Mater Interfaces, vol. 6, no. 18, pp. 16035-16048, September 2014, which is incorporated herein by reference in its entirety.

[3] B. S. Lalia, E. Guillen-Burrieza, H. A. Arafat, and R. Hashaikeh, "Fabrication and characterization of polyvinylidenefluoride-co-hexafluoropropylene (PVDF-HFP) electrospun membranes for direct contact membrane distillation," J Memb Sci, vol. 428, pp. 104-115, February 2013, which is incorporated herein by reference in its entirety.

[4] Y. C. Woo et al., "Electrospun dual-layer nonwoven membrane for desalination by air gap membrane distillation," Desalination, vol. 403, pp. 187-198, February 2017, which is incorporated herein by reference in its entirety.

[5] M. Namdari, F. Zokaee Ashtiani, and E. Bonyadi, "Development of a high flux Janus PVDF membrane for oily saline water desalination by membrane distillation via PDA-TEOS-APTES surface modification," Desalination, vol. 572, p. 117139, March 2024, which is incorporated herein by reference in its entirety.

[6] B. S. Lalia, E. Guillen-Burrieza, H. A. Arafat, and R. Hashaikeh, "Fabrication and characterization of polyvinylidenefluoride-co-hexafluoropropylene (PVDF-HFP) electrospun membranes for direct contact membrane distillation," J Memb Sci, vol. 428, pp. 104-115, February 2013, which is incorporated herein by reference in its entirety.

[7] B. Ozbey-Unal, C. Balcik, and B. Van der Bruggen, "Development of a novel hydrophilic SiO2 PVDF Janus membrane via different modification methods for robust antiwetting and antifouling membrane distillation," Journal of Water Process Engineering, vol. 54, p. 104021, August 2023, which is incorporated herein by reference in its entirety.

[8] Z. Zhu et al., "Monolithic and self-roughened Janus fibrous membrane with superhydrophilic/omniphobic surface for robust antifouling and antiwetting membrane distillation," J Memb Sci, vol. 615, p. 118499, December 2020, which is incorporated herein by reference in its entirety.

[9] H. Ji et al., "Janus membrane prepared via one step depositing coatings onto PVDF/PDMS membrane for simultaneous antiwetting and antifouling in DCMD," Desalination, vol. 539, p. 115964, October 2022, which is incorporated herein by reference in its entirety.

[10] J. A. Prince, D. Rana, T. Matsuura, N. Ayyanar, T. S. Shanmugasundaram, and G. Singh, "Nanofiber based triple layer hydro-philic/-phobic membrane—a solution for pore wetting in membrane distillation," Sci Rep, vol. 4, no. 1, p. 6949 November 2014, which is incorporated herein by reference in its entirety.

The Janus membrane reported in the present disclosure was compared with a brief description of prior fouling results in Table 4 below. The results of the combination foulant with stable flux after 24 hours and consistent rejection % demonstrates that the interaction between the active surface and the support layer, as well as the wettability of the active membrane surface in the developed Janus membrane.

TABLE 4

| Literature comparison of Janus membranes fouling and scaling tests in MD | | | | |
|---|---|---|---|---|
| Janus membrane | Foulants/scalants | Stability | Saline condition | Reference |
| PVDF-PDA/PEI | 0.5M NaCl, 1g/L mineral oil, 0.1 mM NaCl | Stable for 8 hours | 35 g/L | [11] |
| PVDF-PDA/TEOS/APTES | 0.1 mM SDS, 0.5 g gasoline | Stable for 10 hours | 35 g/L | [5] |

TABLE 4-continued

| Janus membrane | Foulants/scalants | Stability | Saline condition | Reference |
|---|---|---|---|---|
| PVDF/POTS/SiO₂-PVAM | 0.1 mM SDS | Stable for 32 hours | 35 g/L | [12] |
| PVDF-PVA/Cu-BTC | CaCl₂, crude oil | Stable for 20 hours | 35 g/L | [13] |
| PVDF-PVA/PAA | 0.05 Mm, 2 g/L mineral oil 20 mM CaCl₂, 20 Mm Na₂SO₄ | Stable for 8 hours | 35 g/L | [14] |
| PVDF-PDA | 4 g/L mineral oil | Stable for 24 hours | 0.6M NaCl | [15] |
| PVDF-OH | Canola oil | Stable for 6.6 hours | 0.6M NaCl | [16] |
| PVDF-SiO₂ | 1 g/L crude oil, 0.1 Mm SDS | Stable for 10 hours | 35 g/L NaCl | [17] |

*Literature comparison of Janus membranes fouling and scaling tests in MD*

[11] L. Meng, X. Chen, T. Cai, X. Tong, and Z. Wang, "*Surface energy-induced anti-wetting and anti-fouling enhancement of Janus membrane for membrane distillation,*" *Water Res*, vol. 263, p. 122176, October 2024, which is incorporated herein by reference in its entirety.

[12] W. Li et al., "*Depositing of PVAM and GA onto PVDF POTS-SiO2 to fabricate a Janus membrane for direct contact membrane distillation (DCMD),*" *Desalination*, vol. 582, p. 117661, August 2024, which is incorporated herein by reference in its entirety.

[13] L. Zheng, M. Tang, Y. Wang, D. Hou, X. Li, and J. Wang, "*A novel Cu-BTC@@PVA PVDF Janus membrane with underwater-oleophobic hydrophobic asymmetric wettability for anti-fouling membrane distillation,*" *Sep Purif Technol*, vol. 299, p. 121807, October 2022, which is incorporated herein by reference in its entirety.

[14] D. Feng, X. Li, and Z. Wang, "*Comparison of omni-phobic membranes and Janus membranes with a dense hydrophilic surface layer for robust membrane distillation,*" *J Memb Sci*, vol. 660, p. 120858, October 2022, which is incorporated herein by reference in its entirety.

[15] D. Shi, T. Gong, R. Wang, W. Qing, and S. Shao, "*Control the hydrophilic layer thickness of Janus membranes by manipulating membrane wetting in membrane distillation,*" *Water Res*, vol. 237, p. 119984, June 2023, which is incorporated herein by reference in its entirety.

[16] M. Mohammadi Ghaleni, A. Al Balushi, S. Kaviani, E. Tavakoli, M. Bavarian, and S. Nejati, "*Fabrication of Janus Membranes for Desalination of Oil-Contaminated Saline Water,*" *ACS Appl Mater Interfaces*, vol. 10, no. 51, pp. 44871-44879, December 2018, which is incorporated herein by reference in its entirety.

[17] B. Ozbey-Unal, C. Balcik, and B. Van der Bruggen, "*Development of a novel hydrophilic SiO2 PVDF Janus membrane via different modification methods for robust antiwetting and antifouling membrane distillation,*" *Journal of Water Process Engineering*, vol. 54, p. 104021, August 2023, which is incorporated herein by reference in its entirety.

Figure 14:
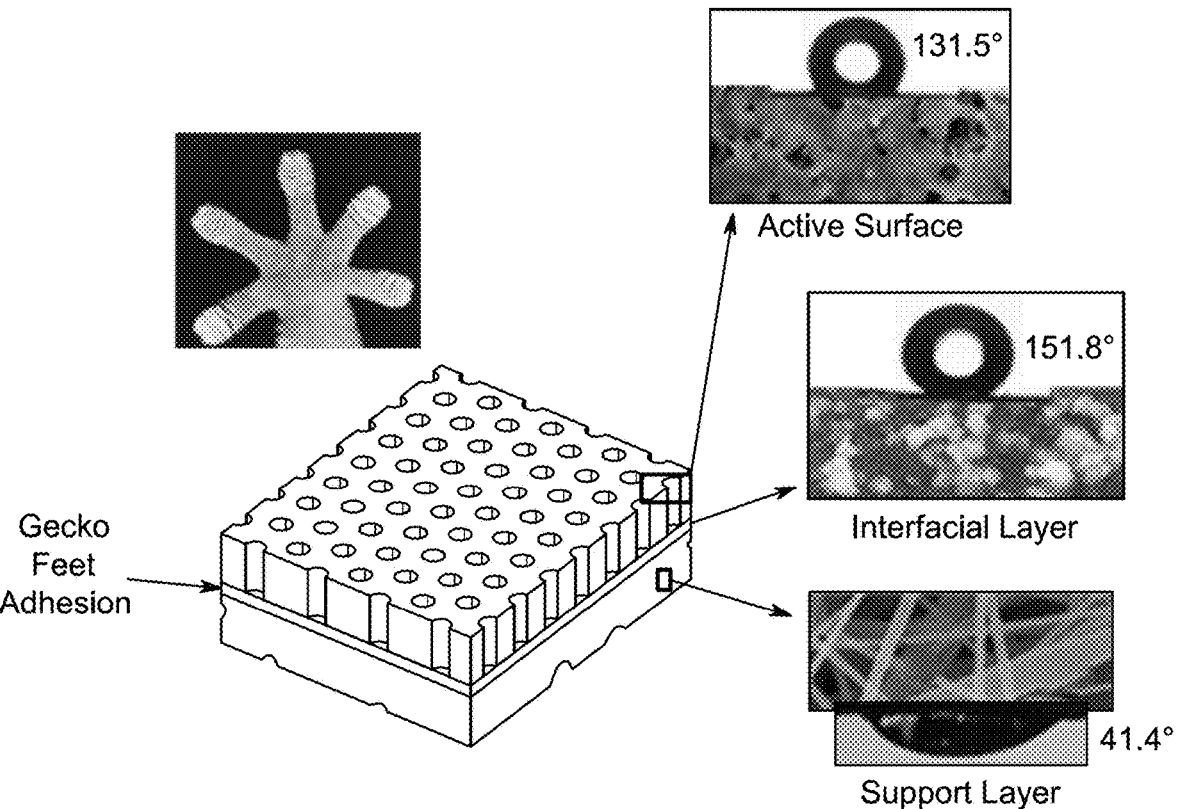
FIG. 14 shows an illustrative image of the multilayer Janus membrane including a hydrophobic active surface, a hydrophobic interfacial layer and a hydrophilic support layer, where the interfacial layer has the concept of Gecko feet adhesion, according to certain embodiments.

The proposed bio-inspired multilayer Janus membrane demonstrates a breakthrough by addressing critical challenges in membrane fabrication such as delamination. A robust interfacial layer engineered with gecko-inspired adhesion mechanism was achieved by electrospraying composite consisting of PVDF-HFP+CuO between PVDF flat sheet membrane and PEI electrospun fibers support (FIG. 14). The synergistic influence of CuO particles in the interface and affinity of active and support layers provided enhanced and stable performance in WGMD, displaying a flux of 36.23 kg m$^{-2}$ h$^{-1}$ and 99.97% saline rejection over 60 hours of continuous operation. This highlights the significance of strategic material selection and interface engineering in advancing desalination technologies, positioning this membrane design as a sustainable and efficient solution for treating hypersaline water.

Numerous modifications and variations of the present disclosure are possible in light of the above teachings. It is therefore to be understood that within the scope of the appended claims, the present disclosure may be practiced otherwise than as specifically described herein.

The invention claimed is:

1. A multilayer Janus membrane, comprising:
a polyvinylidene fluoride (PVDF) layer;
a polyetherimide (PEI) layer, comprising a plurality of PEI fibers; and
an intermediate layer, comprising copper oxide nanoparticles and at least one polymer selected from vinylidene fluoride and hexafluoropropylene copolymer (PVDF-HFP) and polyacrylonitrile (PAN),
wherein the intermediate layer comprises a plurality of granular particles, and is in contact and between the PVDF layer and the PEI layer, and
wherein the PEI fibers interlock between the granular particles of the intermediate layer.

2. The multilayer Janus membrane of claim 1, having a directional wettability, wherein the PVDF layer has a hydrophobic surface, and the PEI layer has a hydrophilic surface.

3. The multilayer Janus membrane of claim 1, wherein the PVDF layer has a water contact angle of 130° to 150°.

4. The multilayer Janus membrane of claim 1, wherein the PVDF layer has a textured porous surface comprising a plurality of PVDF pores with a mean pore size of 0.58 to 0.62 μm, and
wherein the PVDF pores are interconnected with each other, forming a plurality of vertically aligned channels.

5. The multilayer Janus membrane of claim 4, wherein the PVDF pores have openings at the surface, and
wherein the PVDF layer has an average surface roughness of 140 to 180 nm.

6. The multilayer Janus membrane of claim 1, wherein the PEI layer has a water contact angle of 40° to 50°.

7. The multilayer Janus membrane of claim 1, wherein the intermediate layer comprises copper oxide nanoparticles and PVDF-HFP, and
wherein the intermedia layer exhibits a water contact angle of 150° to 160°.

8. The multilayer Janus membrane of claim 7, wherein the granular particles of the intermediate layer form a plurality of particle clusters having non-uniform sizes, and
wherein the granular particles are distributed across the PVDF layer.

9. The multilayer Janus membrane of claim 7, wherein the intermediate layer has an average surface roughness of 650 to 700 nm and a mean pore size of 0.55 to 0.60 μm.

10. The multilayer Janus membrane of claim 1, wherein the intermediate layer comprises copper oxide nanoparticles and PAN, and
wherein the intermediate layer exhibits a water contact angle of 20° to 40° and has a mean pore size of 0.50 to 0.55 μm.

11. The multilayer Janus membrane of claim 10, wherein the granular particles of the intermediate layer are interconnected with a plurality of PAN fibers.

12. The multilayer Janus membrane of claim 1, wherein the PEI fibers intermingle in between the granular particles of the intermediate layer and anchors on the surface of the intermediate layer.

13. The multilayer Janus membrane of claim 1, wherein the PEI layer have a mean pore size of 0.45 to 0.50 μm.

14. A method of fabricating a multilayer Janus membrane having a polyvinylidene fluoride (PVDF) layer, an intermediate layer and a polyetherimide (PEI) layer, comprising:

forming a PVDF solution comprising PVDF in the form of powder, lithium chloride and dimethylformamide;

casting the PVDF solution on a sandpaper substrate to form a PVDF coated sandpaper;

immersing the PVDF coated sandpaper in a mixture of water and isopropanol to form a PVDF membrane coated sandpaper having a PVDF layer with a non-textured surface on the top and a textured surface in contact with the sandpaper substrate;

electrospraying an intermediate solution comprising dimethylformamide, copper oxide nanoparticles and at least one polymer selected from vinylidene fluoride and hexafluoropropylene copolymer (PVDF-HFP) and polyacrylonitrile (PAN) onto the non-textured surface of the PVDF membrane, followed by isolating a two layer membrane from the sandpaper substrate;

mounting the two-layer membrane coated sandpaper onto a rotating drum having an aluminum foil substrate, wherein the textured surface of the PVDF is in contact with the aluminum foil substrate;

electrospinning a plurality of PEI fibers from a PEI solution onto the two-layer membrane to form a three-layer membrane, wherein the PEI solution comprises PEI and N-methyl-pyrrolidone; and drying the three-layer membrane to form the multilayer Janus membrane.

15. The method of claim 14, wherein the intermediate layer comprises a plurality of granular particles, and is in contact and between the PVDF layer and the PEI layer, and wherein the PEI fibers interlock between the granular particles of the intermediate layer.

16. A method of water membrane distillation, comprising:

flowing a saline solution through a multilayer Janus membrane, wherein the saline solution comprises saline at a concentration of 1 to 70,000 ppm, and wherein the multilayer Janus membrane comprises a polyvinylidene fluoride (PVDF) layer, a polyetherimide (PEI) layer, and an intermediate layer comprising copper oxide nanoparticles and at least one polymer selected from vinylidene fluoride and hexafluoropropylene copolymer (PVDF-HFP) and polyacrylonitrile (PAN); thereby absorbing saline on the multilayer Janus membrane to form a filtered water.

17. The method of claim 16, wherein the intermediate layer comprises a plurality of granular particles, and is in contact and between the PVDF layer and the PEI layer, and wherein the PEI fibers interlock between the granular particles of the intermediate layer.

18. The method of claim 16, having a flux of 30 to 40 $kg \cdot m^{-2} \cdot h^{-1}$, wherein the flowing has a duration of 1 to 60 hours.

19. The method of claim 16, having a saline rejection rate of at least 99%, wherein the absorbing has a duration of 1 to 60 hours.

20. The method of claim 16, having a constant saline rejection rate with no decline, wherein the absorbing has a duration of 1 to 60 hours.

\* \* \* \* \*